(12) United States Patent
Ilic et al.

(10) Patent No.: US 12,037,126 B1
(45) Date of Patent: Jul. 16, 2024

(54) EXERGY/ENERGY DYNAMICS-BASED INTEGRATIVE MODELING AND CONTROL METHOD FOR DIFFICULT ELECTRIC AIRCRAFT MISSIONS

(71) Applicant: SmartGridz, Inc., Sudbury, MA (US)

(72) Inventors: Marija Ilic, Sudbury, MA (US); Rupamathi Jaddivada, Cambridge, MA (US)

(73) Assignee: SmartGridz, Inc., Sudbury, MA (US)

( * ) Notice: Subject to any disclaimer, the term of this patent is extended or adjusted under 35 U.S.C. 154(b) by 642 days.

(21) Appl. No.: 16/568,904

(22) Filed: Sep. 12, 2019

Related U.S. Application Data

(60) Provisional application No. 62/730,203, filed on Sep. 12, 2018.

(51) Int. Cl.
  *B64D 31/06* (2006.01)
  *B64D 27/02* (2006.01)
  (Continued)

(52) U.S. Cl.
  CPC ............. *B64D 31/06* (2013.01); *B64D 27/02* (2013.01); *B64D 27/10* (2013.01); *B64D 27/24* (2013.01);
  (Continued)

(58) Field of Classification Search
  CPC ........ B64D 31/06; B64D 27/02; B64D 27/10; B64D 27/24; B64D 2027/026;
  (Continued)

(56) References Cited

U.S. PATENT DOCUMENTS

| | | | |
|---|---|---|---|
| 10,132,238 B2 * | 11/2018 | Sun | F02D 35/02 |
| 10,961,922 B2 * | 3/2021 | Meisner | F02C 9/54 |

(Continued)

FOREIGN PATENT DOCUMENTS

| | | | | |
|---|---|---|---|---|
| CN | 107009866 A | * | 8/2017 | B60K 5/1266 |
| CN | 108501944 A | * | 9/2018 | B60W 30/02 |

OTHER PUBLICATIONS

Liu, "Turboelectric Distributed Propulsion System Modelling", Cranfield University, 2013, 193 pages. (Year: 2013).*

(Continued)

*Primary Examiner* — Phallaka Kik
(74) *Attorney, Agent, or Firm* — Hamilton, Brook, Smith & Reynolds, P.C.

(57) ABSTRACT

Disclosed herein is a fundamental modeling and control method in dynamic energy conversion and transfers in complex energy systems with multiple energy sources, fuel and electric. The multi-layered modeling enables efficient and stable operation through optimized coordination of engines and electric part of a hybrid turbo-electric distribution system (TeDP). A provable coordination of power and rate of change of power interactions between the components is done at the higher-system level. Advanced nonlinear control of components is disclosed to ensure that components meet power/rate of change of power commands given by the higher level. This method is used to demonstrate, for the first time, how rotor stall and surge instabilities in engines can be eliminated by controlling the electric generators and/or storage.

1 Claim, 26 Drawing Sheets

(51) Int. Cl.
  *B64D 27/10* (2006.01)
  *B64D 27/24* (2006.01)
  *F02C 9/48* (2006.01)
  *G06F 30/13* (2020.01)
  *G06F 30/15* (2020.01)
  *G06F 30/17* (2020.01)
  *G06F 30/20* (2020.01)
  *G06F 119/02* (2020.01)
  *G06F 119/06* (2020.01)
  *G06F 119/14* (2020.01)
  *G06F 119/16* (2020.01)

(52) U.S. Cl.
  CPC .......... *F02C 9/48* (2013.01); *B64D 2027/026* (2013.01); *B64D 2221/00* (2013.01); *G06F 30/13* (2020.01); *G06F 30/15* (2020.01); *G06F 30/17* (2020.01); *G06F 30/20* (2020.01); *G06F 2119/02* (2020.01); *G06F 2119/06* (2020.01); *G06F 2119/14* (2020.01); *G06F 2119/16* (2020.01)

(58) Field of Classification Search
  CPC ... B64D 2221/00; F02C 9/48; G06F 2119/16; G06F 2119/06; G06F 2119/14; G06F 2119/02; G06F 30/15; G06F 30/17; G06F 30/13; G06F 30/20
  USPC .......................................... 703/13, 7, 4, 1, 2
  See application file for complete search history.

(56) References Cited

U.S. PATENT DOCUMENTS

| | | | |
|---|---|---|---|
| 11,041,446 B2* | 6/2021 | Graham | F02C 9/26 |
| 2007/0240426 A1* | 10/2007 | Wiegman | F02C 9/18 60/793 |
| 2014/0103727 A1* | 4/2014 | Taimela | H02J 3/46 307/76 |
| 2014/0222310 A1* | 8/2014 | Volponi | F02C 9/00 701/101 |
| 2015/0027118 A1* | 1/2015 | Tricaud | F01N 5/02 60/624 |
| 2015/0113996 A1* | 4/2015 | Cai | F02C 9/54 60/773 |
| 2016/0365722 A1* | 12/2016 | Armstrong | H02H 1/003 |
| 2017/0139894 A1* | 5/2017 | Welch | G06Q 30/00 |
| 2019/0005826 A1* | 1/2019 | Lax | G01C 21/20 |

OTHER PUBLICATIONS

Nerc, "Distributed Energy Resources: Connection Modeling and Reliability Considerations", www.nerc.com, Feb. 2017, 50 pages. (Year: 2017).*

* cited by examiner

The annulus averaged flow never settles and may also show cyclic pattern, referred to as surge cycle.

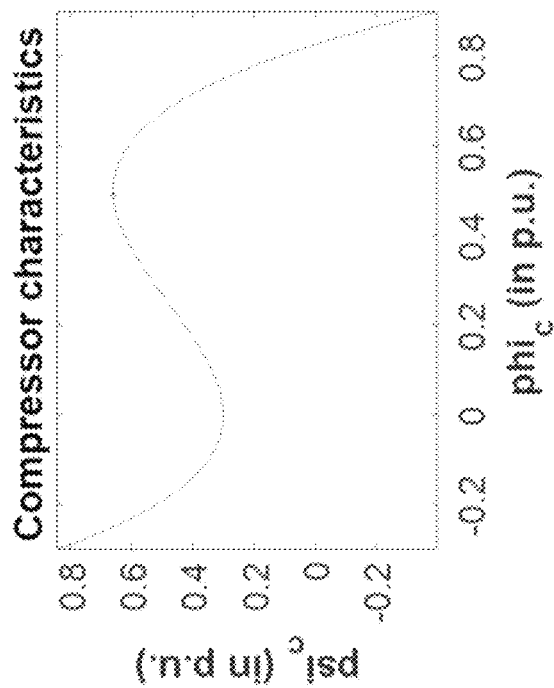
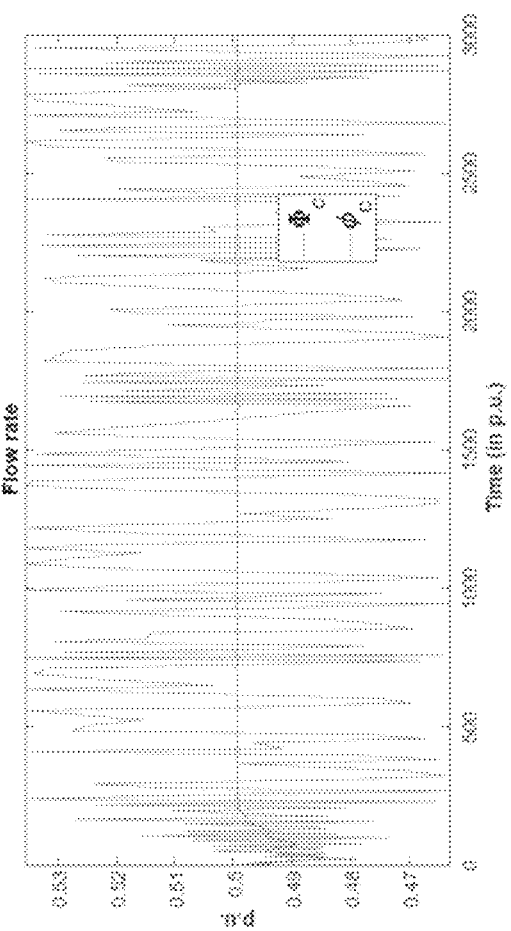
Amplitude of rotating stall oscillations reduced.
Linearized analysis and then gain tuning can be used to completely make the oscillations zero
FIG. 15

Amplitude of surge oscillations reduced. Linearized analysis and then gain tuning can be used to completely make the oscillations zero

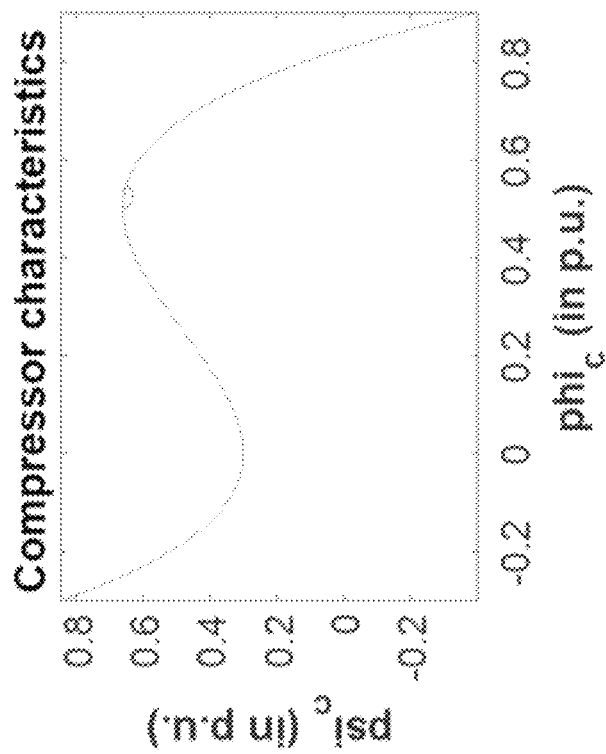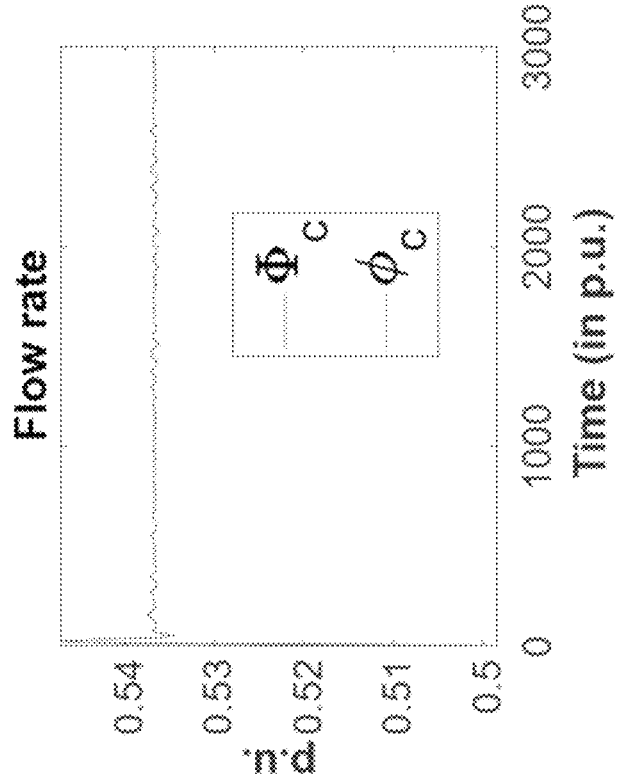
FIG. 17

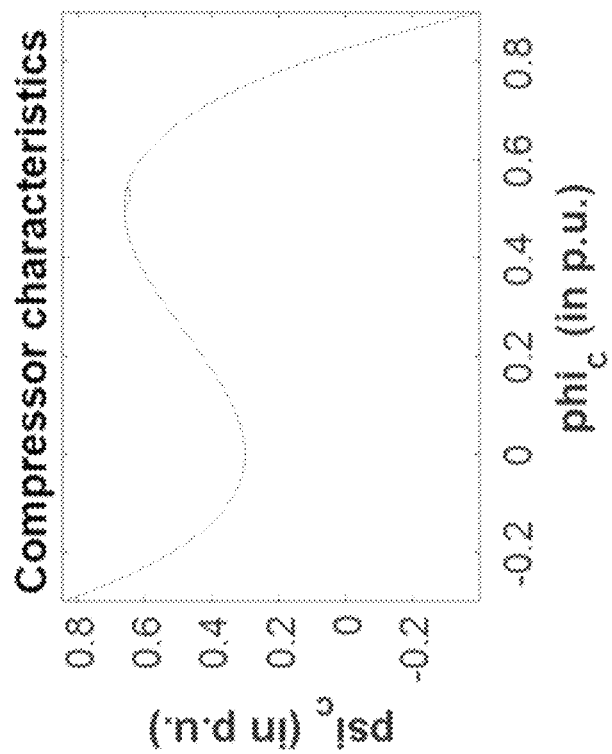
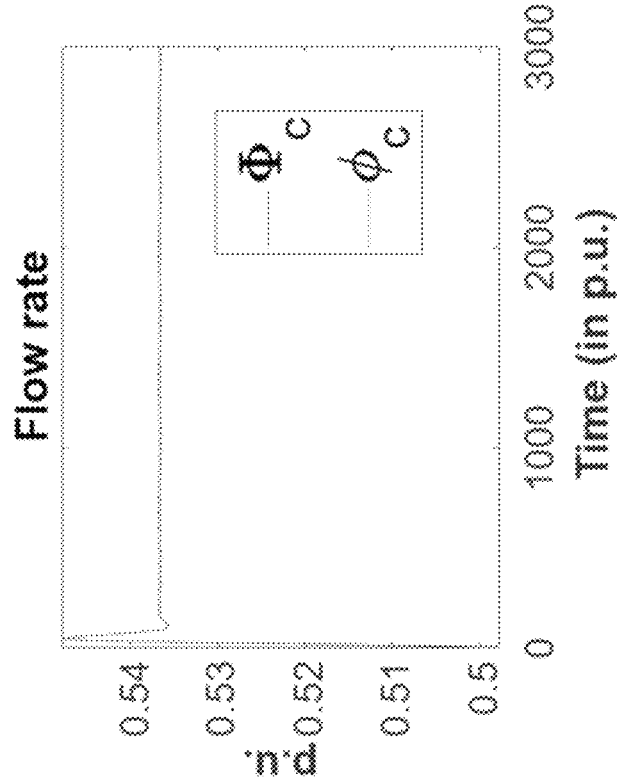
FIG. 18

Notice the smooth response in comparison to simulation 5 without electric drive control Notice the smooth response in comparison to simulation 6 without electric drive control $$\min_{\substack{P^x_{ad}[k], P_{ad}[k], P^f_{ad}[k], P_{ad}[k] \\ Q_{ad}[k], Q_{ad}[k], Q^f_{ad}[k], Q_{ad}[k]}} \sum_{kT_s=0}^{kT_s=T} Q^x_{ad}[k]^2 + Q_{ad}[k]^2 + Q^f_{ad}[k]^2 + Q_{ad}[k]^2$$

s.t.

Interconnection constraints:

$P^x_{ad}[k] + P^f_{ad}[k] + P_{ad}[k] = 0 \mid Q^x_{ad}[k] + Q^f_{ad}[k] + Q_{ad}[k] = 0$ $P_{ad}[k] + P_{ad}[k] = 0 \mid Q_{ad}[k] + Q_{ad}[k] = 0$ Real Power limits:

$\underline{P}^x_{ad}[k] \leq P^x_{ad}[k] \leq \overline{P}^x_{ad}[k]$ $\underline{P}_{ad}[k] \leq P_{ad}[k] \leq \overline{P}_{ad}[k]$ $\underline{P}^f_{ad}[k] \leq P^f_{ad}[k] \leq \overline{P}^f_{ad}[k]$ $\underline{P}_{ad}[k] \leq P_{ad}[k] \leq \overline{P}_{ad}[k]$ Stability constraint:

$[(P^x_{ad}[k+1] - P^x_{ad}[k]) + (P^f_{ad}[k+1] - P^f_{ad}[k])$
$+ (P^f_{ad}[k+1] - P^f_{ad}[k])]/T_s + Q^x_{ad}[k] + Q^f_{ad}[k]$
$+ Q^f_{ad}[k] - 2Q_{cr,s} + Q_{cr,s} \leq \dfrac{E_d[k]}{\tau_e} + \dfrac{E_d[k]}{\tau_d}$ Reactive Power limits:

$Q^x_{ad}[k] \leq Q^x_{ad}(t) \leq \overline{Q}^x_{ad}(t)$ $\underline{Q}_{ad}[k] \leq Q_{ad}[k] \leq \overline{Q}_{ad}[k]$ $\underline{Q}^f_{ad}[k] \leq Q^f_{ad}[k] \leq \overline{Q}^f_{ad}[k]$ $\underline{Q}_{ad}[k] \leq Q_{ad}[k] \leq \overline{Q}_{ad}[k]$ eDP Interaction Model:

$(E_d[k+1] - E_d[k])/T_s = P_d[k] + P^f_{ad}[k] - E_d[k]/\tau_d = p_d[k]$ $(p_d[k+1] - p_d[k])/T_s = 4E_{cr}[k] - Q^f_{ad}[k] - Q^f_{ad}[k] + 2Q_{cr,s}[k]$ Engine interaction model:

$(E_{cr}[k+1] - E[k])/T_s = P^x_{ad}[k] + P_d[k] + P^f_{ad}[k] + P_{ad}[k] - E_s/\tau_c[k] = p_s[k]$ $(p_s[k+1] - p_s[k])/T_s = 4E_{cr}[k] - Q^x_{ad}[k] - Q^x_{ad}[k] - Q^f_{ad}[k] + 2Q_{cr,s}[k]$

FIG. 22

$$\min_{u_c(t)} \int_{kT_f}^{(k+1)T_f} (P_{cs}(\tau) + P_{sc}[k])^2 + (\dot{Q}_{cs}(\tau) + \dot{Q}_{sc}[k])^2$$
$$+ (P_{cb}(\tau) + P_{bc}[k])^2 + (\dot{Q}_{cb}(\tau) + \dot{Q}_{bc}[k])^2 \, d\tau$$

s.t.

State space model:

$\dot{x}_c(t) = f_{x,c}(x_c(t), P_{cb}(t), P_{cs}(t), m_c(t), u_c(t))$

Outputs of interest:

$y_c(t) = f_{y,c}(x_c(t), P_{cb}(t), P_{cs}(t), m_c(t), u_c(t))$

Limits on output and control:

$\underline{y}_c \leq y_c(t) \leq \overline{y}_c$ $\underline{u}_c \leq u_c(t) \leq \overline{u}_c$ $\forall t \in [kT_f, (k+1)T_f]$

FIG. 23

EXERGY/ENERGY DYNAMICS-BASED INTEGRATIVE MODELING AND CONTROL METHOD FOR DIFFICULT ELECTRIC AIRCRAFT MISSIONS

CROSS-REFERENCE TO RELATED APPLICATIONS

This utility patent application claims priority from U.S. provisional patent application Ser. No. 62/730,203, filed Sep. 12, 2018, titled "EXERGY/ENERGY DYNAMICS-BASED INTEGRATIVE MODELING AND CONTROL METHOD FOR DIFFICULT ELECTRIC AIRCRAFT MISSIONS" naming inventors Dr. Marija Ilic and Rupamathi Jaddivada.

GOVERNMENT FUNDS

This invention was made with government support under contract number NNX15CC89P awarded by the National Aeronautics and Space Administration (NASA). The government has certain rights in the invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2015-2018 New Electricity Transmission Software Solutions, Inc. (NETSS).

BACKGROUND

Field of Technology

This relates to aircraft and spacecraft manufactures. More specifically, this relates to the control of hybrid turboelectric aircraft and spacecraft systems. Since the turboelectric distributed propulsion (TeDP) systems are at their infant stages, there exists a major need for computer-aided methods and systems that assist rapid modeling, development, and control design. Particularly challenging is on-line control system design to support stable power provision in both aircraft and spacecraft systems. The TeDP systems have the potential to provide highly flexible power to air vehicles in response to their requirements for power during both normal and extreme conditions. Particularly challenging is the problem of operating turbo-electric system which is required to meet multiple performance (efficiency, reduced pollution, stability) when the missions are highly dynamic, including pulse loads.

Background

Companies working in this field include United States Air Force, United States Department of Defense, Aurora, Boeing, General Electric, Airbus, and Safran.

DESCRIPTION OF PRIOR ART

The design and power-electronic control of individual air vehicle energy system components is well understood today during quasi-stationary aircraft use, such as cruising. Non-linear adaptive control for operating over broad ranges of flight conditions is much less mature. Even less consideration has been given to integrating these components into electric power systems that operate in adaptive-conditions-driven ways to ensure fault-tolerance, stability, and efficiency. For example, the dynamic interactions between turbo (engine) and electric parts of future aircraft systems have not been modeled nor there exist methods for their systematic control. Since the turbo-electric system is responsible for producing power to supply aircraft missions by controlling both energy conversion within components and energy transfer between the components, it is important to introduce methods which directly control these dynamic energy processing. No such energy-based methods exist at present.

Presently much is known about the design and power of electronic control of individual energy system components (e.g. loads, batteries, flywheels), but there is very little systems-based thinking about integrating these different modules to operate in adaptive conditions-driven ways and to ensure fault-tolerance, stability, and efficiency. Particularly challenging is control of aircrafts during highly dynamic missions. Generally, this requires oversized design of engines to avoid engine instabilities, notably rotor stall and surge in conventional single-spool aircraft designs. Turbo-electric distributed propulsion (TeDP) design offer the promise of utilizing control in the electrical part of the aircraft, including fast storage control. However, there is no systematic method for modeling and control for such purposes.

There is increasing complexity of the emerging TeDP systems in NASA, commercial, and military aircraft. For example, the TeDP systems required for future NASA (N+3) generation aircraft are similar to terrestrial electric power systems. However, the TeDP systems are more complex, because modeling and controlling their rotating equipment, constant power loads, and large loading swings all require a deeper understanding of the TeDP-interconnected system dynamics than is typically available for terrestrial systems today. A singular challenge is presented by the power-electronically switched equipment that has become an integral part of the dynamic networks that are TeDP systems. Modeling and control of such heterogeneous interconnected components to ensure stable and reliable power provision is a monumental challenge given today's state-of-the-art. In particular, there exists inherent lack of methods for operating conditions dynamic modeling and control of physical processes underlying the energy conversion and transfer between the engine and the electric part of the TeDP.

The key technical problem comes from the challenge of designing an alternative efficient and "green" TeDP aircraft system without increasing the overall aircraft weight, while ensuring stable and safe operation for time-varying missions. This can only be achieved by designing controls for the complex TeDP system that utilize rigorous physics-based dynamical models and carefully designed controllers.

Previous state-of-the-art does not offer such dynamic models, and it does not propose the control design that is theoretically sound for guaranteeing performance over wide ranges of operating conditions. Since such dynamic models and controls do not exist, coordinated optimization of schedules for turbines and propulsors cannot be performed.

The prior art resorts to the worst-case design of individual components and does not optimize, nor does it offer automation for stable dynamics. As a result, it becomes impossible to meet the objective of having efficient, clean, stable, and safe TeDP.

When the TeDP systems are used in future air vehicles, it is essential to ensure their stable, fault-tolerant, and efficient operation. Methods and systems for ensuring this through automated feed-forward and feedback control are essential. The unique challenge discussed herein is multi-modal control which is dependent on the mission specifications. Notably, during quasi-stationary cruise-like missions when the only objective might be fuel cost reduction, the main energy source is in the engine. However, during highly dynamic unplanned missions (pulse load) it is conceptually possible to utilize highly flexible control of the electrical part of the aircraft, in particular power-electronically controlled generator, motor, and storage control. This is essential to prevent well-known engine instabilities at fast speeds without making the engines overly large. This is probably the first obvious major benefit from TeDP.

Prior efforts have focused on simulating response of TeDP and not on control design for meeting dynamic performance metrics, stability in particular. Prior work does not offer an energy-based control modeling and control design which is multi-layered. The multi-layering is critical for setting clear specifications of engines, generators, motors, fans and storage in terms of common interface variables. Often the component controllers are designed by different specialists without having information about the ranges of outputs they are expected to meet when interconnected to the rest of the aircraft components. This makes the overall design complex and therefore challenging design for performance.

NON-PATENT LITERATURE DOCUMENTS

Modeling Engine:
Greitzer, E. M., 1976. Surge and rotating stall in axial flow compressors—Part I: Theoretical compression system model. Journal of Engineering for Power, 98(2), pp. 190-198.
Moore, F. K. and Greitzer, E. M., 1986. A theory of post-stall transients in axial compression systems: Part I—Development of equations. Journal of engineering for gas turbines and power, 108(1), pp. 68-76 [REF. 3B], 231-239 [REF. 3A].
Gravdahl, J. T. and Egeland, O., 1997, December. A Moore-Greitzer axial compressor model with spool dynamics. In Decision and Control, 1997., Proceedings of the 36th IEEE Conference on (Vol. 5, pp. 4714-4719). IEEE.
Vepa, R., 2013. Dynamic modeling, simulation and control of energy generation. Springer.
Jaffe, R. L. and Taylor, W., 2018. The Physics of Energy. Cambridge University Press.
Modeling Electrical Components:
Cvijic, S., Allen, E., Lang, J., Toward Autonomous Stable Energy Management of Hybrid Electric Aircraft Propulsion Systems, NASA Phase II final report, May 2018.
Ilić, M., Bachovchin, K., Miao, X., Jaddivada, R., "State Space Modeling and Primary Control of Smart Grid Component", Cambridge University Press, August 2018 (to appear).
Ilic, M. D. and Zaborszky, J., 2000. Dynamics and control of large electric power systems. New York: Wiley.
Bachovchin, K., Jaddivada, R., Ilia, M., "Centralized Automated Modeling of Power Systems", Invention Disclosure No.: 2017-152, Provisional patent filed—February 2017.
Mapping to Energy Space:
Ilić, M. D. and Jaddivada, R., 2018. Multi-layered interactive energy space modeling for near-optimal electrification of terrestrial, shipboard and aircraft systems. Annual Reviews in Control [REF. 1].

Ilic, M. D., 2016. Toward a unified modeling and control for sustainable and resilient electric energy systems. Foundations and Trends® in Electric Energy Systems, 1(1-2), pp. 1-141.
Ilic, M. and Liu, S., 2012. Hierarchical power systems control: its value in a changing industry. Springer Science & Business Media.
Ilić, M. D. and Liu, Q., 2012. Toward sensing, communications and control architectures for frequency regulation in systems with highly variable resources. In Control and Optimization Methods for Electric Smart Grids (pp. 3-33). Springer, New York, N.Y.
System Level Modeling and Control:
Ilić, M. D. and Jaddivada, R., 2018. Multi-layered interactive energy space modeling for near-optimal electrification of terrestrial, shipboard and aircraft systems. Annual Reviews in Control [REF. 1].
Ilić, M., Jaddivada, R., Miao, X., Popli, N., "Toward multi-layered MPC for complex electric energy systems", Chapter in "Handbook of MPC", Birkhauser, 2018.
Chapman, J. W., Lavelle, T. M., May, R. D., Litt, J. S. and Guo, T. H., 2014. Toolbox for the Modeling and Analysis of Thermodynamic Systems (T-MATS) User's Guide.
Arntz, A., Atinault, O. and Merlen, A., 2014. Exergy-based formulation for aircraft aeropropulsive performance assessment: theoretical development. AIAA Journal, 53(6), pp. 1627-1639 [REF. 2].
Hayes, D., Lone, M., Whidborne, J. F., Camberos, J. and Coetzee, E., 2017. Adopting exergy analysis for use in aerospace. Progress in Aerospace Sciences, 93, pp. 73-94.
Component Level Controllers:
Liaw, D. C. and Abed, E. H., 1996. Active control of compressor stall inception: a bifurcation-theoretic approach. Automatica, 32(1), pp. 109-115.
Gravdahl, J. T. and Egeland, O., 2012. Compressor surge and rotating stall: Modeling and control. Springer Science & Business Media.

None of the existing products provide solution with (1) full dynamic model of engine-electric system TeDP; (2) the detailed dynamic model in energy space of engine comprising compressor, burner, turbine subsystems and their interactions (3) detailed dynamic model of electric system in energy space; (4) control method for coordinating energy exchange between engine and electric system; (5) control of engine to ensure given instantaneous power and rate of change of reactive power for engine the electric part; and (6) coordinating mechanism for aligning abilities of coordinated exchanges and local subsystems to jointly enable feasible, stable and optimal TeDP system operation. Elements (1)-(6) are essential for near-optimal design and operation of TeDP in electric aircraft system.

What is needed, therefore, is a framework for systematic integration of components that is capable of meeting seemingly conflicting sub-objectives, namely having efficient, clean, stable, and safe TeDP. In addition, it is essential to introduce higher-level models and control design based on sending commands for interface variables between diverse parts of the aircraft. Once these are computed, system-specific internal dynamics is controlled to ensure these specifications be met. Based on concepts in REF. 1, such general modeling framework is established. The basic intuition underlying such multi-layered design is that the dynamics of higher layer model should be written in terms of common variables, in particular, stored energy and rate of change of stored energy (power). Current state-of-the-art does not offer such modeling nor model-based control design method.

BRIEF SUMMARY

Disclosed herein is a fundamental modeling and control method in dynamic energy conversion and transfers in complex energy systems with multiple energy sources, fuel and electric. The multi-layered modeling enables efficient and stable operation through optimized coordination of engines and electric part of a hybrid turbo-electric distribution system (TeDP). A provable coordination of power and rate of change of power interactions between the components is done at the higher-system level. Advanced nonlinear control of components is disclosed to ensure that components meet power/rate of change of power commands given by the higher level. This method is used to demonstrate, for the first time, how rotor stall and surge instabilities in engines can be eliminated by controlling the electric generators and/or storage.

U.S. patent application Ser. No. 16/174,736 (filed 2018 Oct. 30, assigned to NETSS, titled "Method For Autonomous Stable Energy Management Of Aircraft/Spacecraft Turbo-Electric Distributed Propulsion (TEDP) Systems", naming inventors Dr. Marija Ilic, Dr. Kevin Bachovchin, Dr. Sanja Cvijic, and Dr. Jeffrey Lang) (hereinafter "NETSS Application '736") is hereby fully incorporated by reference. NETSS Application '736 discloses methods and systems for modeling and controlling the disparate components (e.g. generators, storage, propulsors, and power electronics) that comprise an aircraft turbo-electric distributed power (TeDP) system. The resulting control system is hierarchical and interactive. Layer one is the physical electric power system. Layer three is an optimization system that determines set points for system operation. Layer two, in between layer one and layer three, includes nonlinear, fast, dynamic power-electronic controllers that hold the operation of the power system to the desired set points. Communication between these layers ensures feasibility and stability of the controlled operation. Simulations demonstrate that the resulting control system ensures stability and maximum efficiency.

In the technology disclosed herein, an energy-based multi-layered modeling is introduced using concepts in REF. 1. The major innovation comprises interaction models in terms of energy-form agnostic variables. These are dynamics of stored energy $E(t)$ in the systems comprising an electric aircraft, and dynamics of rate of change of stored energy $p(t)$. The dynamics of rate of change of stored energy is further interpreted as a combination of stored energy in tangent space $Et(t)$ ad dynamics of generalized reactive power $Q(t)$. It is these variables that meet general conservation of power and conservation of reactive power dynamics that set the basis for defining interfaces between the layers and within the layers. The higher layer control design becomes the problem of optimizing these interaction variables in a model-predictive way, which, in turn, are given as commands to the interacting subsystems (engine, generator, storage) to compute their local automation so these are followed. Also, the higher layer control is done with given ranges of these variables that are feasible by the subsytems themselves. The dynamics of rate of change of stored energy is further related to the acceleration of shafts interconnecting electric and engine parts. This forms a major rationale for nonlinear control design of local automation needed to regulate their interaction variables according to commands given. In this disclosure, (1)-(4) are derived for (a) conventional single spool aircraft turbine; (b) representative TeDP system; and (c) the energy-based control of the engine itself with hydraulic actuators. It is shown that hydraulic control of TeDP requires much higher control limits during dynamic missions than the proposed multi-layered integrated TeDP control in energy space.

Features and Advantages

It is derived in REF. 1, for the first time, how the internal mapping is done from the original physical states into these interface variables. One of the main aspects of this disclosure is the application of the general concepts given in REF. 1 for deriving a multi-layered modeling and control method for turbo-electric part of the aircraft. Many assumptions made in currently used models are carefully relaxed to capture their relevant dynamics typical of highly challenging dynamic missions. The following parts are introduced: (1) novel detailed engine and electrical part of the aircraft models; (2) their mapping into energy state space model; (3) system level energy-space based integrative engine-electric part control; lower level engine and electric part controllers needed to; and (4) a proof-of-concept example of rotor stall/surge control using this integrative control.

Control design for both components and the interconnected system will become essential when the system is operated closer to its stability limits to improve efficiency and to address environmental concerns. In particular, nonlinear control design will become critical to ensure the reliable and safe provision of power during sudden major equipment failures, such as engine or generation unit, or propulsion. Moreover, as the TeDP systems are designed with secondary power components, their coordination must be executed in a systematic way by viewing them as complex dynamic systems. Extensive scenario analyses focused on enhancing component-level control designs only—and expert-based tuning of these—will no longer be sufficient to ensure stability and safety during abnormal conditions. This modeling approach targeted to systematic control design sets the foundation for interactive hierarchical control for these systems, which is based on the inclusion and understanding of the dynamics of the system for contingency assessment and management using both state and state transition information.

For the first time, multi-layered dynamics of interactions and detailed engine and electric part of TeDP are derived in energy space. While this builds in part on the ideas put forward in NETSS Application '736, this is the first time that both engine and electric part are modeled with clear interpretation of energy conversion and transfer processes. These are used, in turn, for multi-layered control design. Proof-of-concept stabilization of engine dynamic process with the control of electric subprocess are shown for the first time.

This disclosure maintains the same line of thinking as in NETSS Application '736, with the addition of deriving the interconnected system in energy space. Stored energy is used as the starting variable instead of Lagrangian. An initial relation between the exergy (potential maximum work) and anergy (wasted work), as concepts pro-actively pursued by the aero-space community is established. This is important as it provides strong physical interpretation of what can do work in the aircraft, and what is lost; notably, our modeling framework enables to control these variables according to performance metrics of interest, while ensuring that the design is feasible and stable.

Another feature is that we apply nonlinear passivity-based control logic in order to ensure stable and safe delivery of power over a wide range of aircraft operating conditions dictated by the power demand specifications for next-generation aircraft. When designing passivity-based controls, the control law is derived from closed-loop energy functions which have desirable properties. This energy-based formulation for both modeling the dynamics and for designing their control is ideal for analyzing the different types of energies in future aircraft systems. Disclosed herein is how is this done for aircrafts with difficult missions.

Another feature is that the actual monitoring and decision-making is fundamentally multilayered, both spatially and temporally. The main idea is to embed the complexity into the lower layers, and coordinate optimization by the higher layers interactively with the lower layers. We are applying computationally robust optimization of interaction variables (energy, power, reactive power dynamics) set-points for controllers to achieve efficient, reliable, and reduced carbon fuel use. Disclosed herein is how to do this in energy/exergy space. The local automation is nonlinear and based on p(t), without which it would be impossible to have provable control of interface variables.

BRIEF DESCRIPTION OF THE DRAWINGS

In the drawings, closely related figures and items have the same number but different alphabetic suffixes. Processes, states, statuses, and databases are named for their respective functions.

FIG. 15 shows simulation 3: State of art nonlinear throttle control of rotor stall.

FIG. 17 shows Simulation 5: Proof-of-concept—proposed control applied to throttle for controlling rotor stall reacting to Qdot signal at the hydraulic port variable, i.e. at the compressor inlet.

FIG. 18 shows simulation 6: Proof-of-concept—proposed control applied to throttle for controlling surge reacting to Qdot signal at the hydraulic port variable, i.e. at the compressor inlet.

FIG. 22 shows the information exchange framework for near-optimal multi-layered control.

FIG. 23 shows the control formulation for coordinating energy exchange between engine and electric system.

DETAILED DESCRIPTION INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

A-DyMonDS—same as AirCraft-DyMonDS.

Aircraft-DyMonDS—Aircraft Dynamic Monitoring and Decision Systems is a framework introduced herein for the control of aircraft power systems.

Distributed Propulsion (DP) is a type of powered flight propulsion system for fixed-wing aircraft in which engines are distributed about a vessel. Its goal is to increase performance in fuel efficiency, emissions, noise, landing field length and handling performance. DP is typically accomplished by spanwise distribution of partially or fully embedded multiple small engines or fans along the wing. Alternatively, it may involve ducting exhaust gases along the wing's entire trailing edge (en.wikipedia.org/wiki/Distributed_propulsion).

DP—same as Distributed Propulsion.

DYM—same as DyMonDS.

DyMonDS—same as Dynamic Monitoring and Decision Systems.

Dynamic Monitoring and Decision Systems (DyMonDS) is framework introduced herein for the control of terrestrial power systems. It includes the combination of the autonomous control (second layer) and the system optimization (third layer).

Layer one—the physical electric power system.

Layer two—in between layer one and layer three, includes nonlinear, fast, dynamic power-electronic controllers that hold the operation of the power system to the desired set points.

Layer three—a global optimization system that determines set points for system operation.

NETSS—New Electricity Transmission Software Solutions, Inc. (a Delaware corporation), the assignee of this patent document.

NETSSWorks—software developed by NETSS that is used in layer three.

TeDP—Turbo-Electric Distributed Propulsion.

Operation

The methods and systems described herein enable an understanding of, and the creation of a control description for, TeDP systems that is similar (in a broad sense) to our understanding of stable operation in the changing terrestrial electric-power utility systems.

Figure 11:
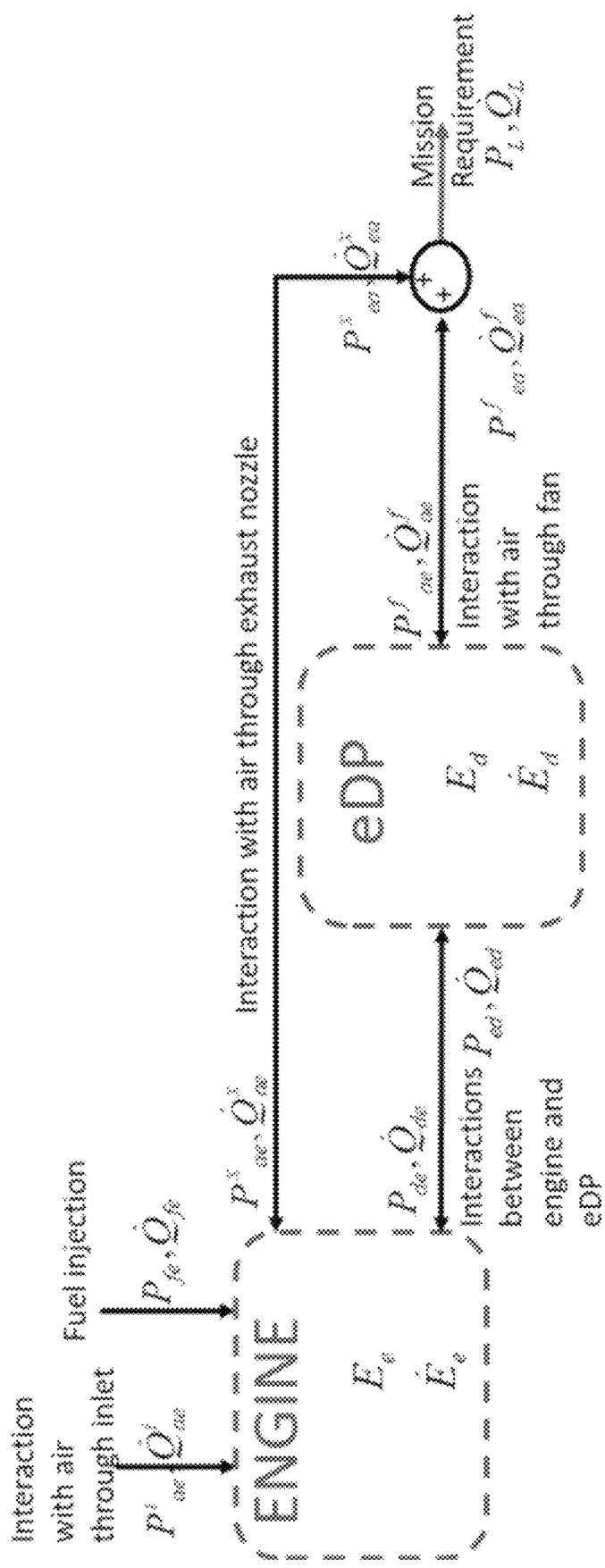
FIG. 11 shows example 3: New higher-layer energy-based dynamic model of TeDP system.

This data-enabled autonomous stable management of turbo-electric distribution systems in aircrafts and spacecrafts embodies interactions of (a) system-level dynamic optimization of commands for rate of change of stored energy (power) P(t) and the rate of change of generalized reactive power Qdot in the engine and in the electric distribution given the aircraft mission specifications of the same variables; and (b) fast, nonlinear, feedback controller logic of engine and electric distribution (including storage) for stabilizing components to the commands given by the system level optimization problem. This is achieved by designing controls for the complex TeDP system that utilize the new multi-layer interactive dynamic modeling in energy space proposed, for the first time, herein. The automated feedback internal to engine and electric system are novel nonlinear controllers reacting to rate of change of generalized reactive power Qdot and, therefore, ensuring that the commands for these variables given by the higher system-level are followed. In reference to FIG. 11, given aircraft mission requirements (load—L) for power and rate PL and rate of change of generalized reactive power OdotL (in FIG. 11), these are further mapped to requirements in terms of the same energy space variables as commands to all TeDP components after solving the system-level optimization problem in energy space described in what follows. This optimization in energy space is a key component of this disclosure. It requires the novel TeDP modeling disclosed herein, and, as a result, it becomes a convex optimization problem, as shown in detail in FIG. 22. This overcomes the major complexity brought about by the nonlinear models currently used in terms of physical state variables. The complexity is embedded into engine itself and the electric distribution/storage control process. Here, nonlinear control is needed to control commands given in energy space. These are described in what follows, as well.

The methods and systems described herein include on-line closed-loop dynamic model-predictive setting for the controllable equipment, both engine and electric distribution, within a TeDP system as new missions are anticipated. Notably, the higher-layer controller is implemented as a closed-loop dynamic system, and, as such, it is capable of responding to sudden even unanticipated changes in aircraft missions and unplanned disturbances. This is a major innovation when compared to the earlier filed NETSS Application '736. The controllers embedded in the physical equipment are highly adaptive, and, for the range of missions, autonomously ensure stable response to changes in these set points. They are fault tolerant with respect to communication failures in between the higher level scheduler of set points and the physical equipment. In rare situations, when control set points are set for conditions outside of the design specifications, the controllers will signal to the higher level the need for further adjustments of system-level requirements. For the first time, controllers for engines and electric distribution are designed to control interaction variable commands given in energy space. This overcomes the need for many approximations made in state-of-art power electronics controllers which inherently require use of droops to map energy space commands to the physical set points of controllers, such as in hydraulic actuators, field excitation of generators, or motors/propulsors, storage, and the like. Avoiding these approximations enables provable performance of nonlinear control of the entire TeDP in energy space, disclosed herein for the first time.

This is demonstrated below by (1) choosing two example aircraft electric power systems (Architecture #1 and Architecture #2) and developing dynamic models for them; (2) deriving system set points that constitute optimized allocations of resources in energy space; (3) developing stabilizing controllers for system operation around the set points given in energy space; and (4) carrying out simulations (Scenario #1, Scenario #2, and Scenario #3) to first reproduce potential dynamic problems in open loop, such as rotor stall and surge (Scenario #1, Simulations 1 and 2); then the state of the art control of engine throttle is simulated (Scenario #2, Simulations 3 and 4); this is followed by simulating proposed control in energy space assuming only engine throttle is controlled (Scenario #3, Simulations 5 and 6); and finally, by simulation proposed control in energy space by controlling both engine throttle and electric distribution torque (Scenario #4, Simulations 5 and 6).

Figure 7:
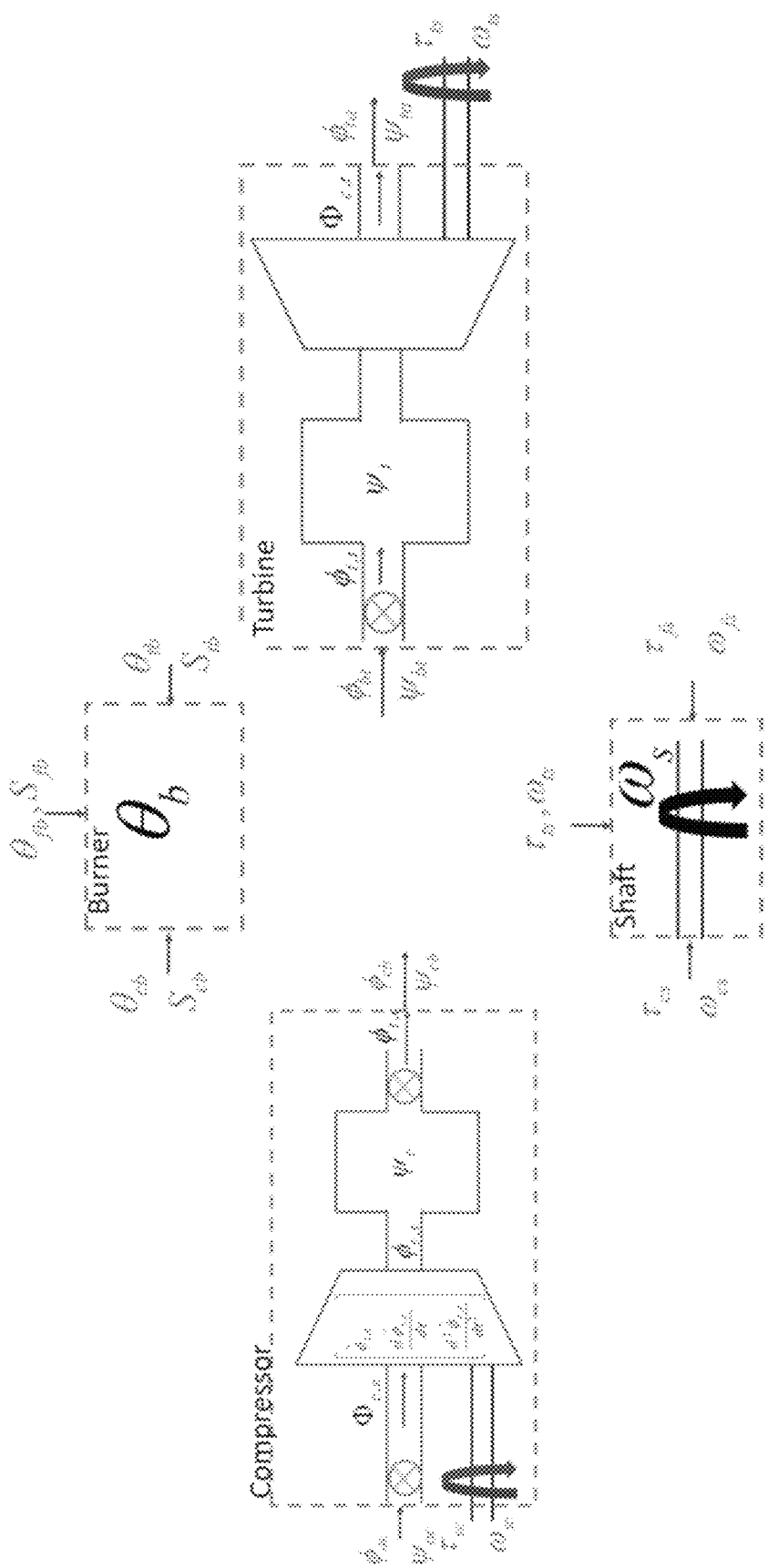
FIG. 7 shows Example 1: Turbo-engine: Individual component dynamics in physical state space.
Figure 8:
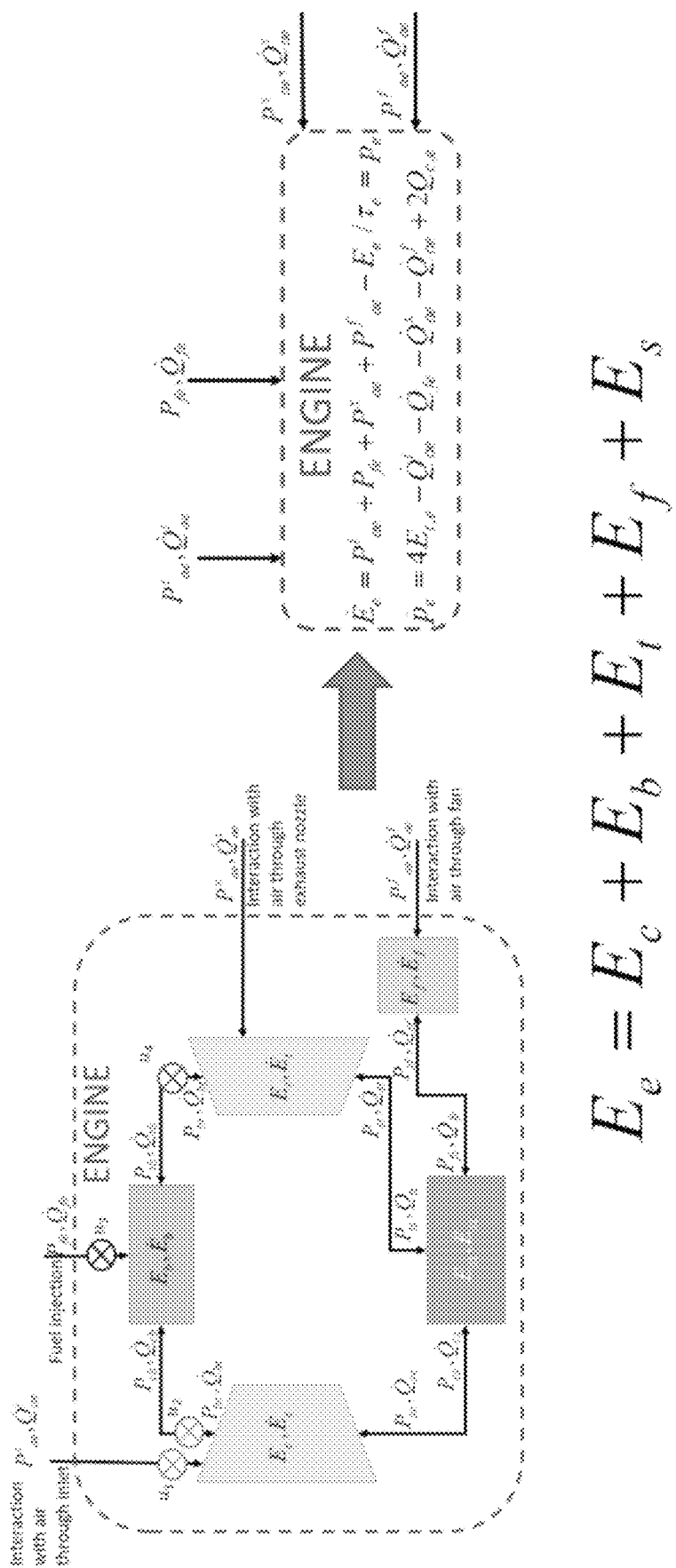
FIG. 8 shows Example 1: New energy-based dynamic model of turbo-engine.
Figure 9:
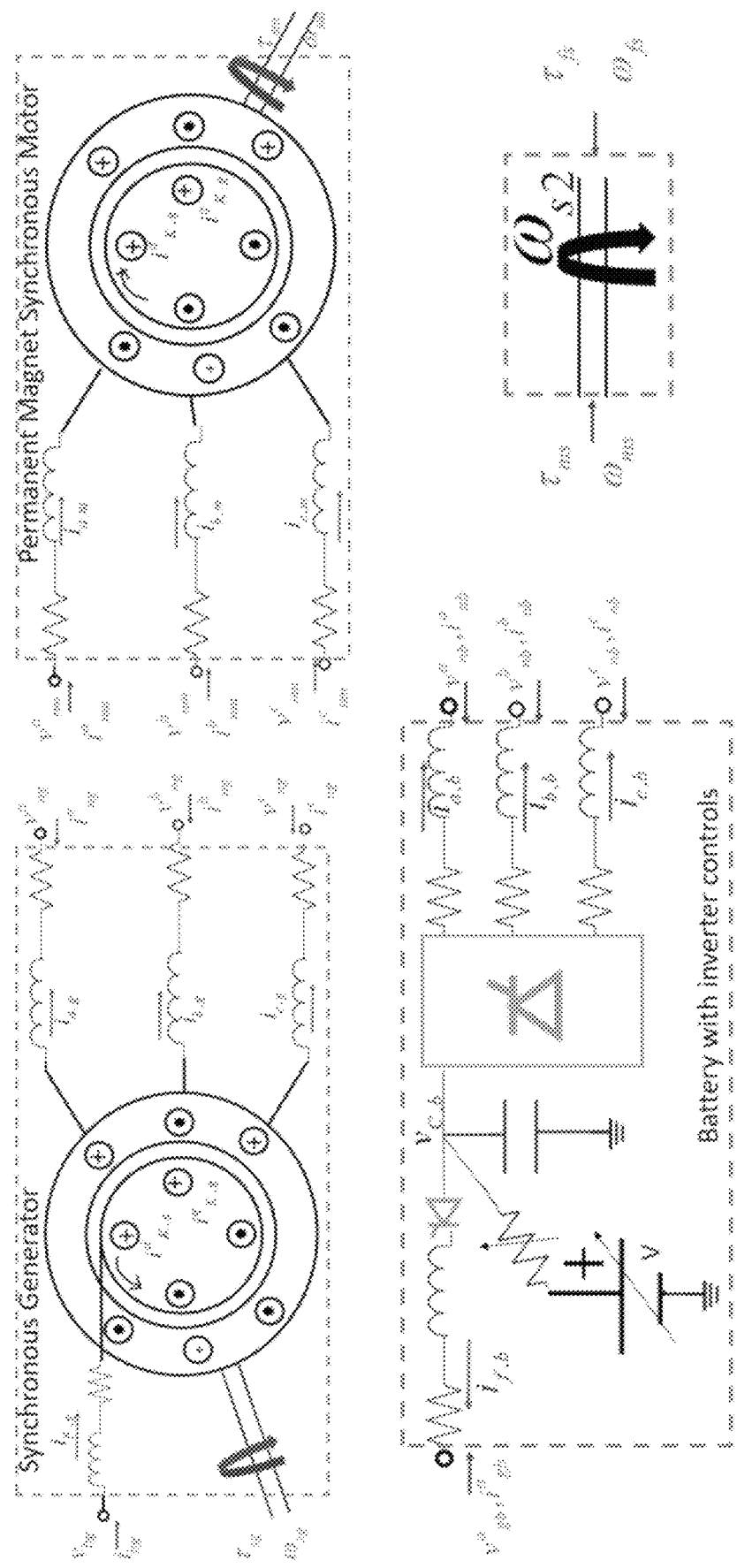
FIG. 9 shows Example 2: eDP-electric part of TeDP component dynamics using physical variables.
Figure 10:
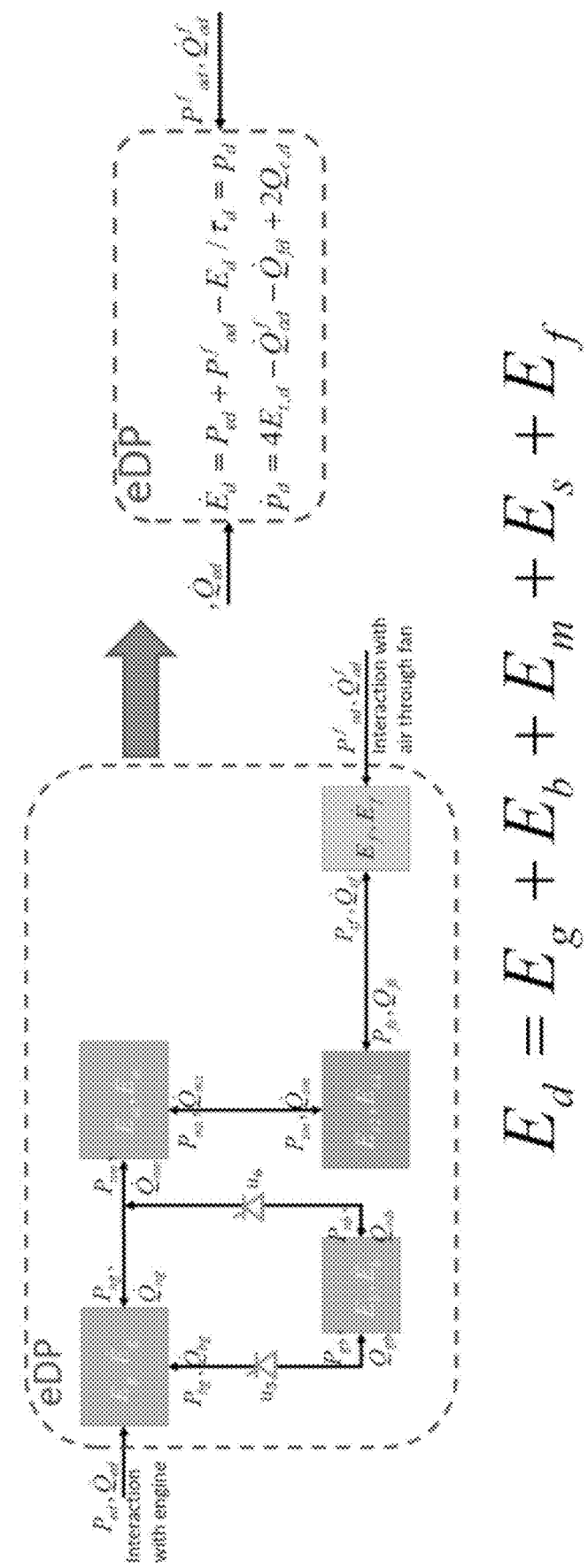
FIG. 10 shows Example 2: New energy-based dynamic model of eDP system.

Referring to FIG. 7 and FIG. 8, shown is a sketch of engine component in the conventional state space and in the new energy space, respectively. Similarly, referring to FIG. 9 and FIG. 10, shown is a sketch of the electric distribution propulsion (eDP), both in conventional physical state space, and in the new energy space, respectively. Shown in FIG. 11 is the higher system level layer of the interconnected TeDP (Architecture 1, FIG. 2) represented in the new energy space. All the interaction variables are indicated in the sketch with the subscripts corresponding to the particular components. Communication between these layers as shown is essential for ensuring both the feasibility and the stability of the controlled operation. Together, layer two and layer three form the Dynamic Monitoring and Decision Systems (DyMonDS) conceptualized in NETSS Application '736. A key component of this disclosure is the modeling of interactions and local control specifications in energy space.

Figure 3:
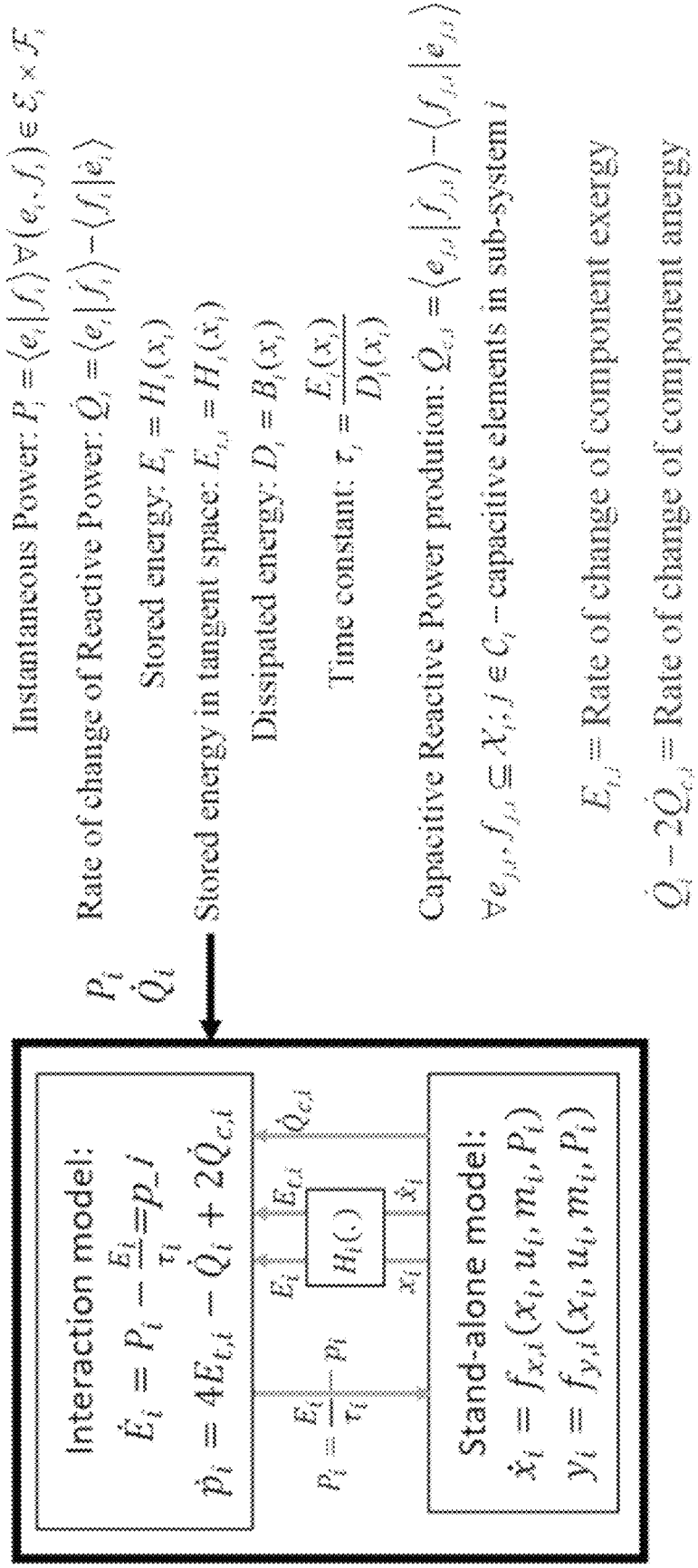
FIG. 3 shows component-level general model in energy space.
Figure 4:
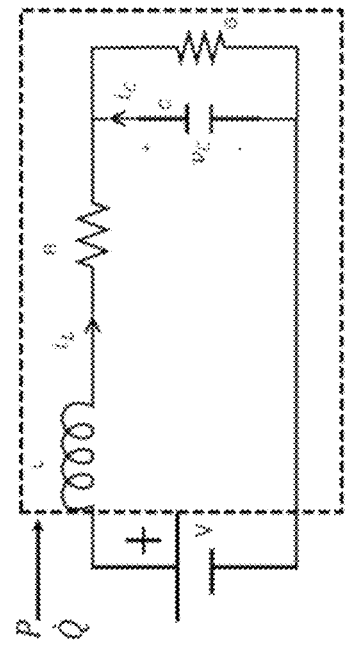
FIG. 4 shows a simple example of interactive model in energy space—electrical circuit.
Figure 5:
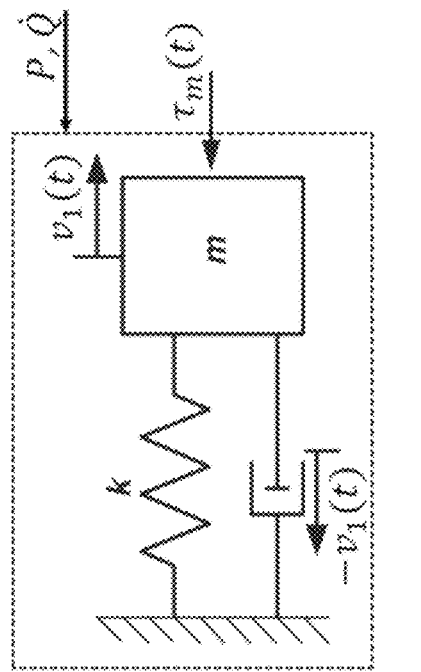
FIG. 5 shows a simple example of interactive model in energy space—mechanical system.
Figure 6:
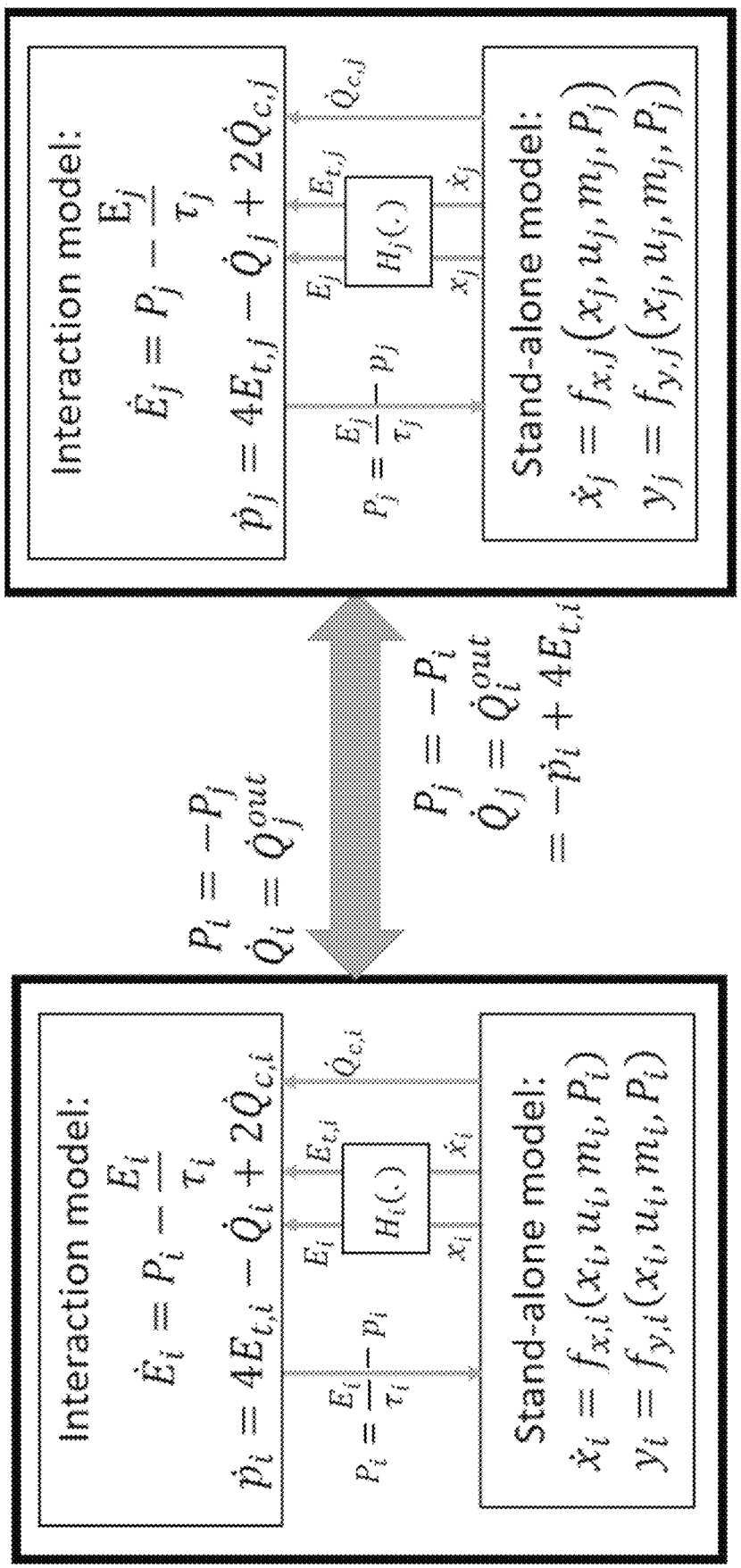
FIG. 6 shows a multi-layered interactive general model.

Continuing now with FIG. 11. The overall TeDP power system of interest is complex. It comprises both energy conversion dynamics in the engine, in the electric distribution and the energy transfers in between them. Modeling in energy space manages this complexity naturally, allowing for the selective multi-layering of the network without loss of system dynamics. Dynamics of components and their autonomous control are derived using general energy physical laws from classical mechanics and electric laws of physics, respectively; these are expressed in terms of physical state variables x, local control u, local disturbances m, and interacting power P, as shown in the lower block of stand-alone general component model, FIG. 3. Shown in FIG. 3 is the key mapping of this model given in terms of physical variables into dynamics of aggregate stored energy E(t), and rate of change of stored energy p(t). This mapping is diffeomorphic and generalizable for any type of energy conversion process. This means that engine module can be conceptualized in terms of energy conversion the same way as electric generator, motor, storage, and alike [REF. 1]. Similarly, the interconnected system dynamics reflect the most general conservation laws—in particular conservation of energy—at the interfaces of components themselves. Given this fact, the interconnected TeDP aircraft system can be conceptualized by using the general interconnection model in energy space, FIG. 6. In FIG. 4 and FIG. 5, simple examples of electric and mechanical systems are interpreted using energy space, respectively.

Figure 1:
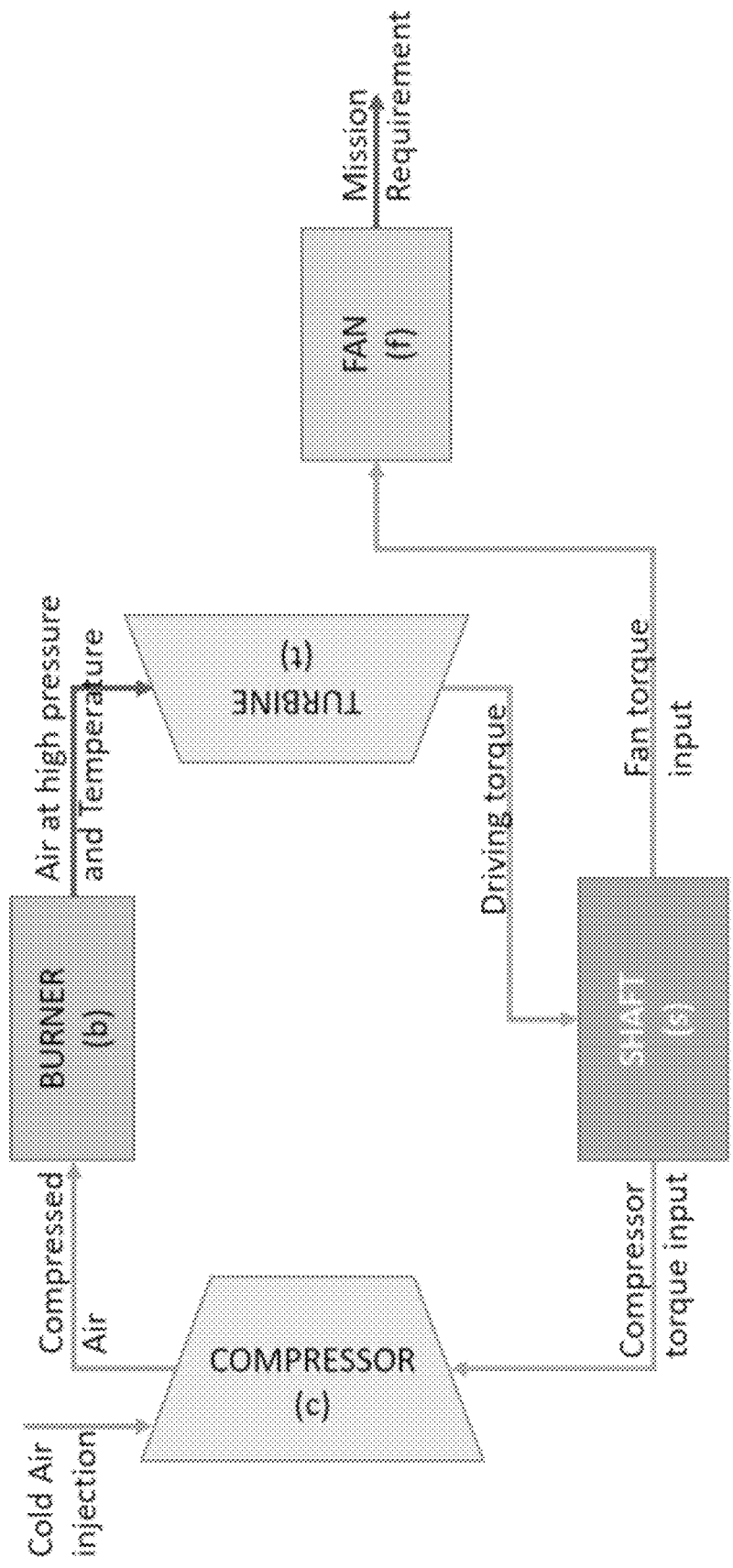
FIG. 1 shows Architecture 1: Conventional single-spool turbo-engine aircraft.

FIG. 1 shows the conventional single-spool turbofan system, Architecture #1.

Figure 2:
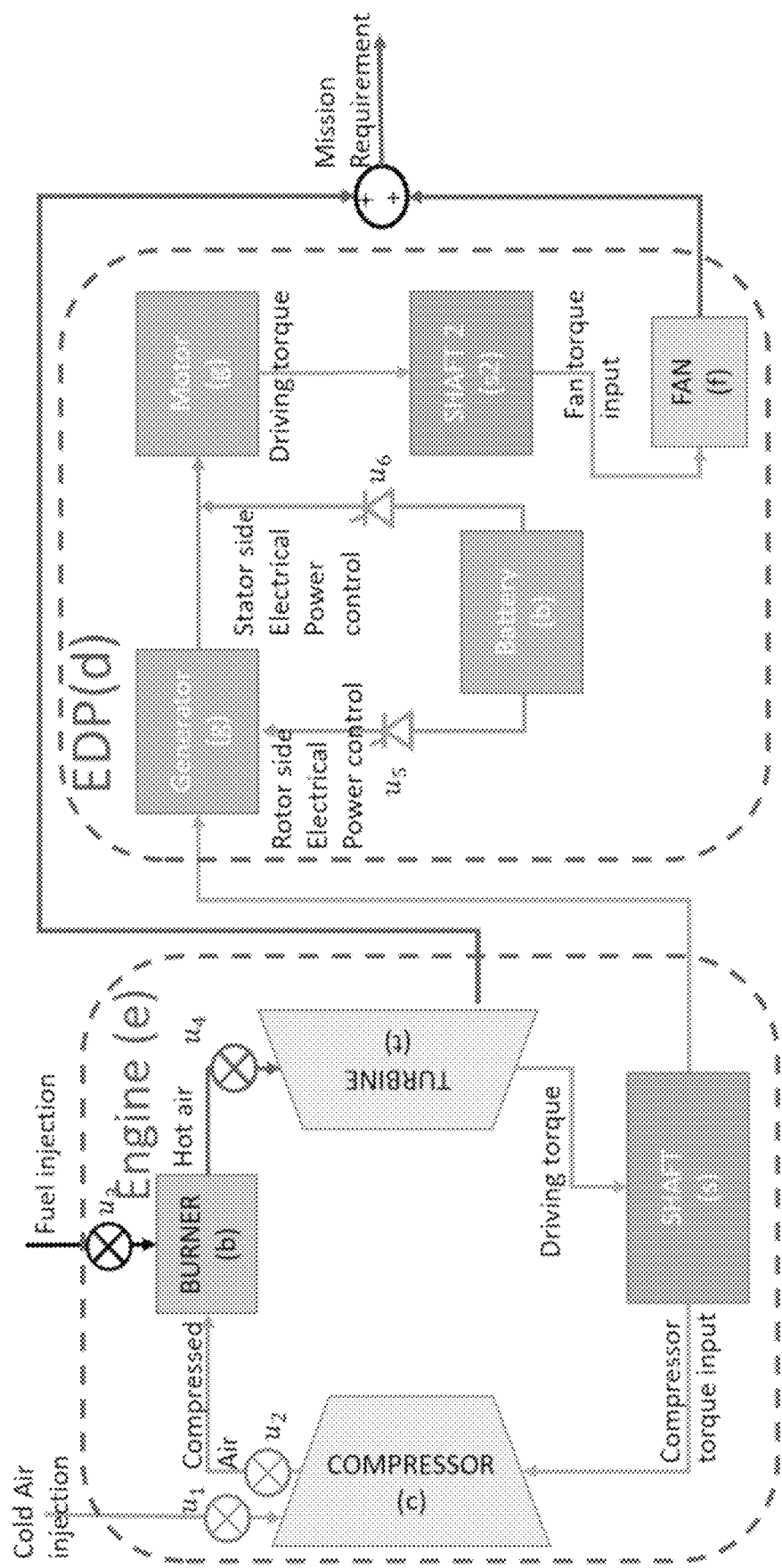
FIG. 2 shows Architecture 2: Turbo-electric distributed propulsion (TeDP).

FIG. 2 shows the turbo electric distribution propulsion (TeDP) system, Architecture #2.

FIG. 8 shows the internal decomposition and modeling principles in new energy space of the engine itself comprising compressor, burner, shaft and turbine.

FIG. 9 shows the internal decomposition of the electric distribution system and modeling principles of the electric distributed propulsion (eDP) in the conventional state space.

FIG. 10 shows the internal decomposition of the electric distribution system and modeling principles of the electric distributed propulsion (eDP) in the newly introduced energy space.

To model the open-loop dynamics of aircraft power system components in the new energy space, a general modeling approach of any stand-alone dynamic component is taken. Shown is that the starting point are the existing dynamical models of components modeled in the conventional state space. These are then mapped into the dynamics of their stored energy E(t) and rate of change of stored energy p(t) as indicated in general FIG. 3 and with the new variables defined in the same figure. Notably, the new concepts of energy stored in tangent space Et(t) and the rate of reactive power (generalizable for any energy conversion processes [REF. 1]) Qdot, are interpretable as potential maximum work which can be done by the component, and wasted work in the component due to interactions. These two concepts are known in the literature as exergy and anergy, and are proactively studied for efficient design of aircrafts [REF. 2]; our models are the first of its kind which introduce the dynamics of these concepts and utilize them for integrative control design to ensure stable and near-optimal operation. A broad variety of candidate components of electric distribution and engines in future aircrafts can be conceptualized and modeled using the approach shown in FIG. 3. In this disclosure, only the simplest architectures are used for avoiding excessive complexity.

Control Method for Coordinating Energy Exchange Between Engine and Electric System.

Figure 21:
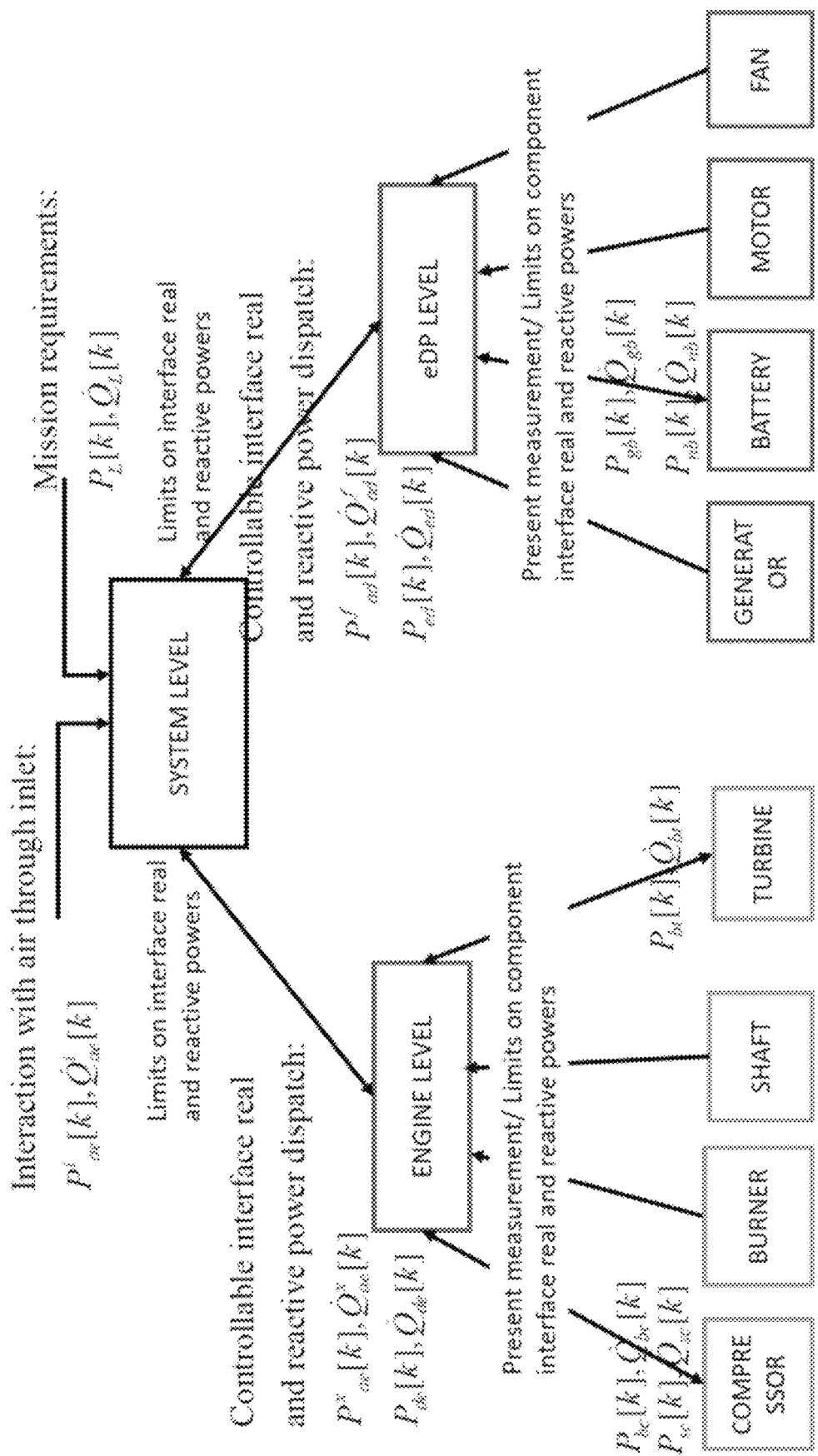
FIG. 21 shows the data-enabled information flow of signals in a closed-loop manner for the entire TeDP.

Shown in FIG. 21 is the data-enabled information flow of signals in a closed-loop manner for the entire TeDP. Both the flow chart (FIG. 21) and the basic mathematical formulation (FIG. 22) of the coordinating optimization in energy space are shown. This dynamic model predictive control (MPC)-based coordination in energy space is key to enabling interactions within a given TeDP so that the components communicate their limits on interaction variable they can provide as operating conditions vary, and, given these, the coordinating optimizations schedules set points so that the overall dynamic efficiency of the TeDP are optimized.

Figure 12:
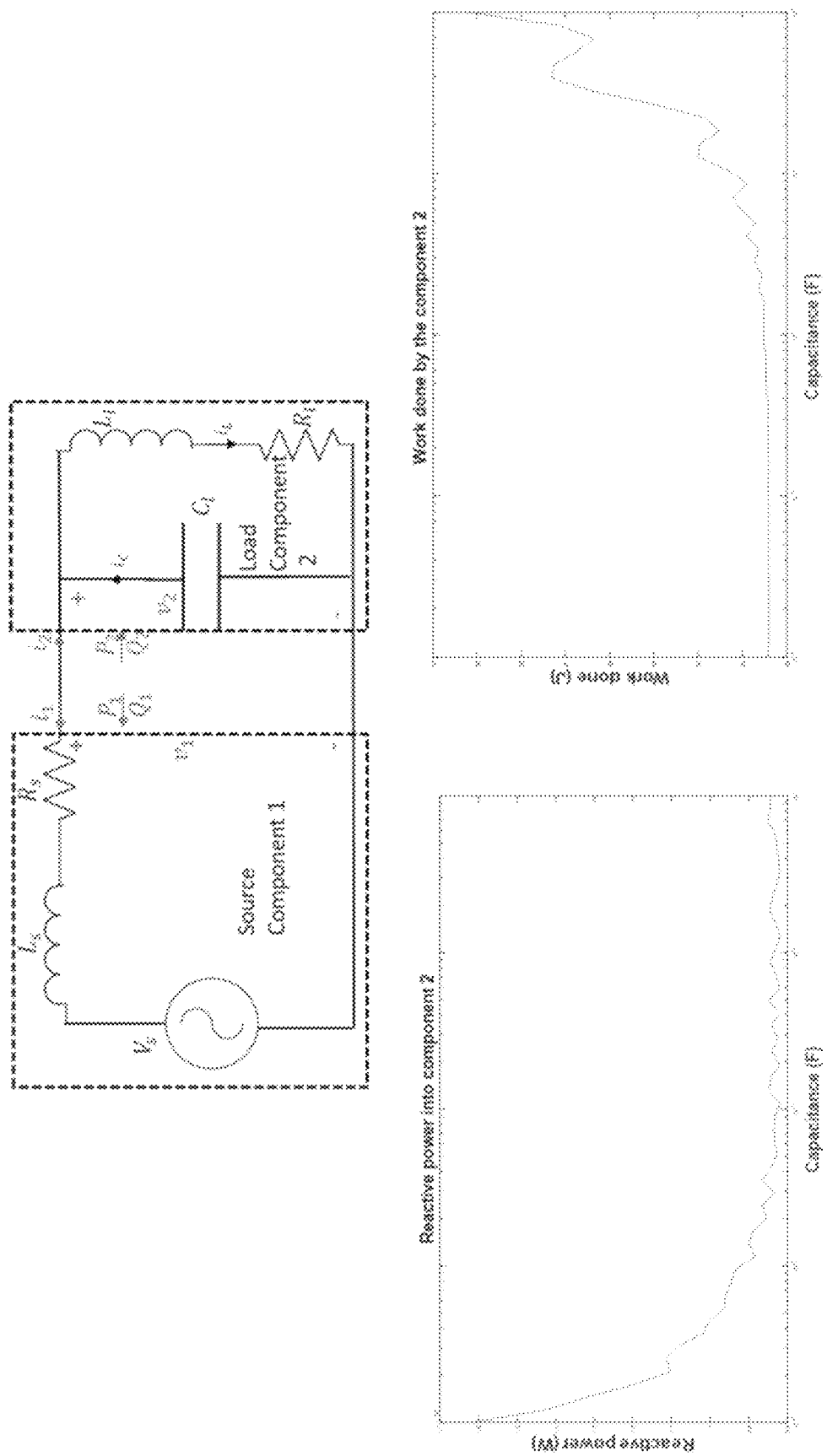
FIG. 12 shows optimization in energy space—Importance of reactive power Q for efficiency [REF. 1].

A major concept here is that the dynamic efficiency of the system can be expressed as minimal work wasted [REF. 1]. In reference to FIG. 12, it is shown that maximum work (exergy) is achievable when wasted work (anergy) is minimized. FIG. 12 illustrates this fact in context of designing small capacitive storage to help deliver most work from the energy source. Because of this, efficiency optimization shown in FIG. 22 is expressed as the performance metrics in terms of minimizing total anergy. Extremely exciting concept, further generalizable to thermal processes.

Control Method for System Components (Engines, Electric Distribution).

Shown in FIG. 23 is a mathematical formulation of the component level control design needed to optimize efficiency in combination with fuel cost minimization. This is first shown in conventional state space.

Figure 24:
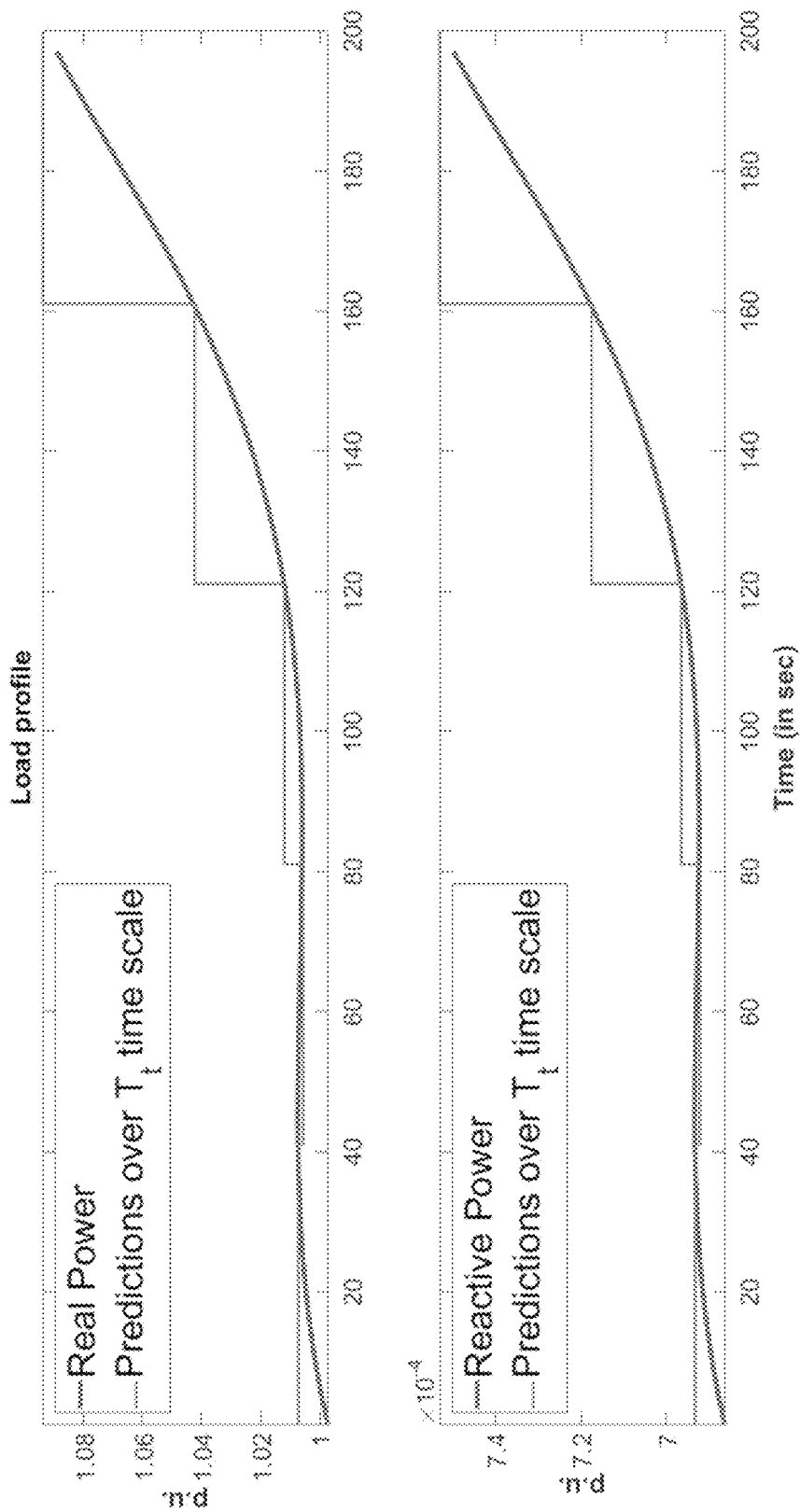
FIG. 24 shows reference given to component (generator) in energy space.

The most important is the reformulation of this control design in the energy space. For the case of a simple electric generator-load (aircraft mission) electric distribution system, shown in FIG. 23 is how given PL, QLdot the governor and field excitation of the electric generator can be controlled in energy space so that these targets are followed in a stable manner. See FIG. 24, reference given to component (generator) in energy space.

Figure 25:
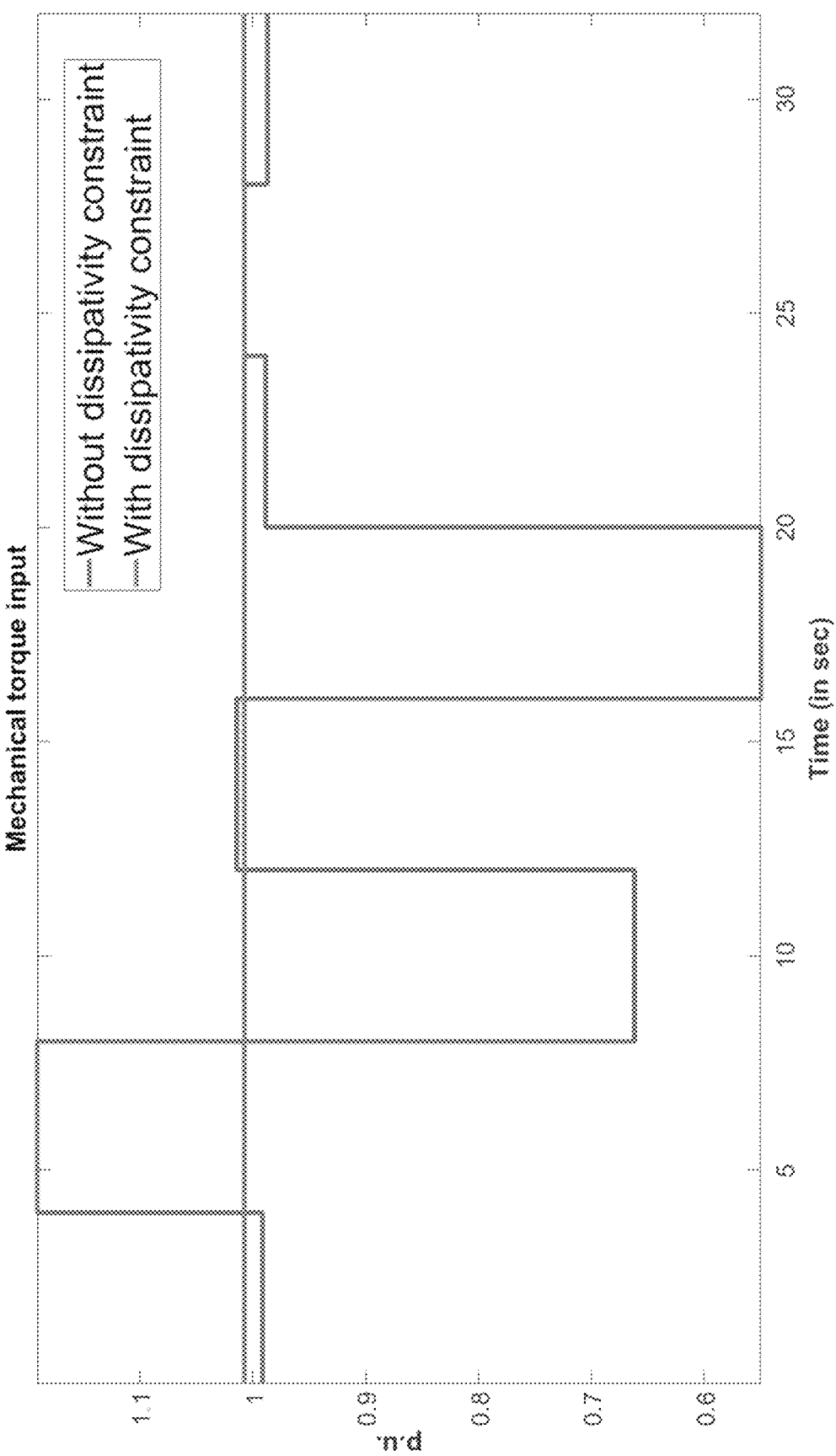
FIG. 25 shows required mechanical torque control.
Figure 26:
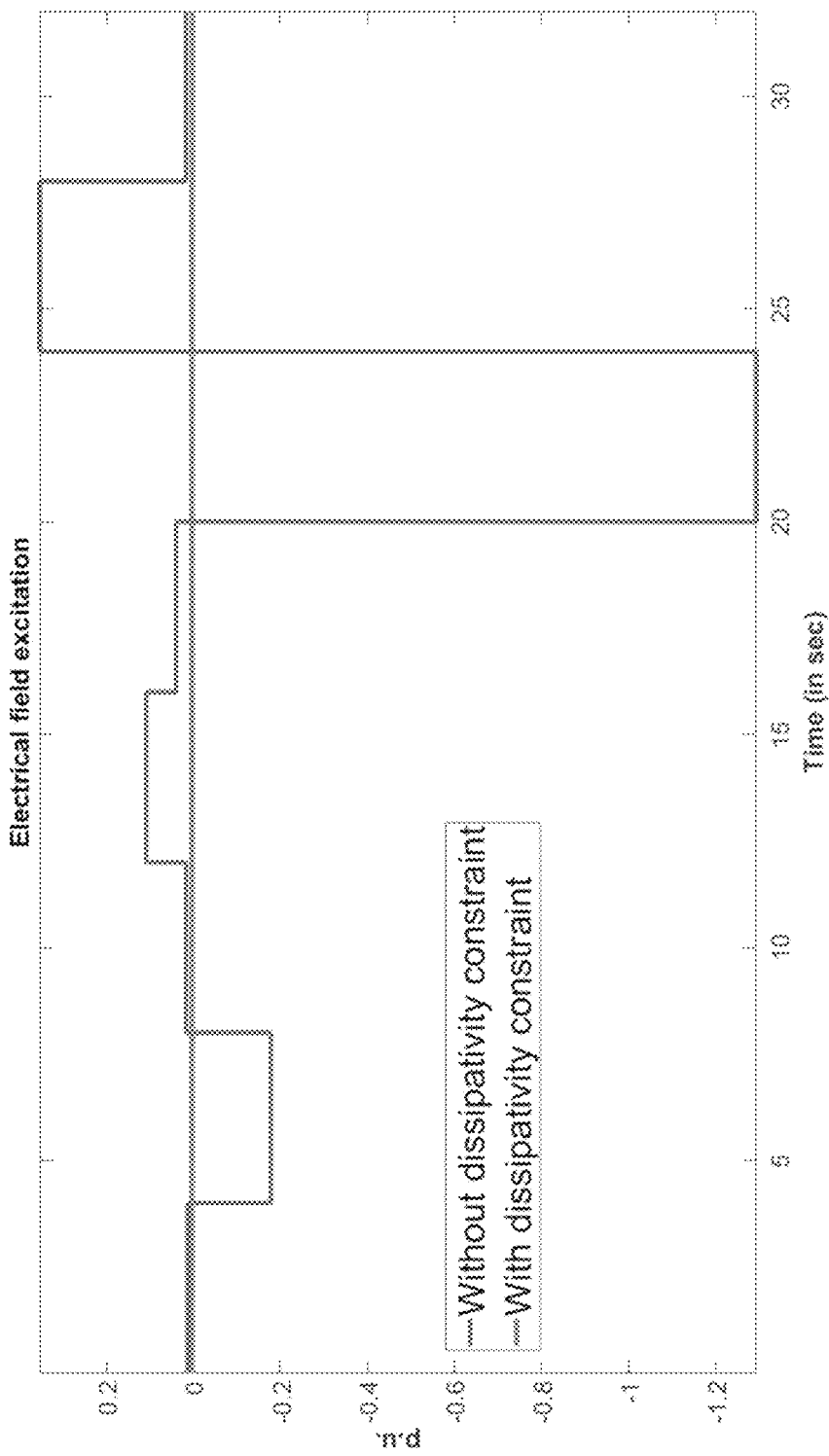
FIG. 26 shows required electrical field excitation control.

This is achieved by solving the coordinator problem above first, for computing power and Qdot that generator should control, done every 40 seconds. Each 40th second, the load is split into mechanical and electrical commands to governor and exciter. The nonlinear control is designed to follow these commands. See FIG. 25, required mechanical torque control and FIG. 26, required electrical field excitation control.

Proof-of-Concept Simulations of TeDp Control in Energy Space.

Four scenarios are set to demonstrate how the proposed control works, and, consequently, the major potential of proposed control method in energy space.

Figure 13:
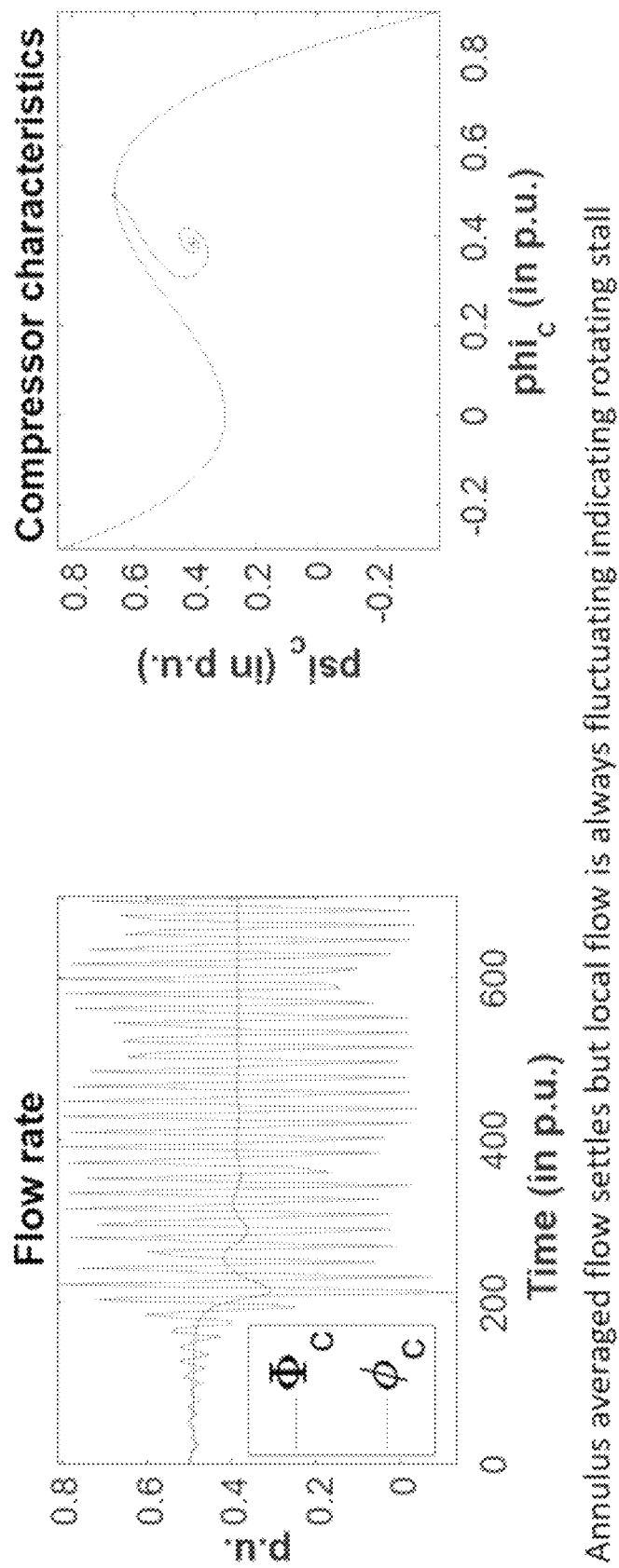
FIG. 13 shows Simulation 1: Open-loop rotating stall, Greitzer parameter B=0.5.
Figure 14:
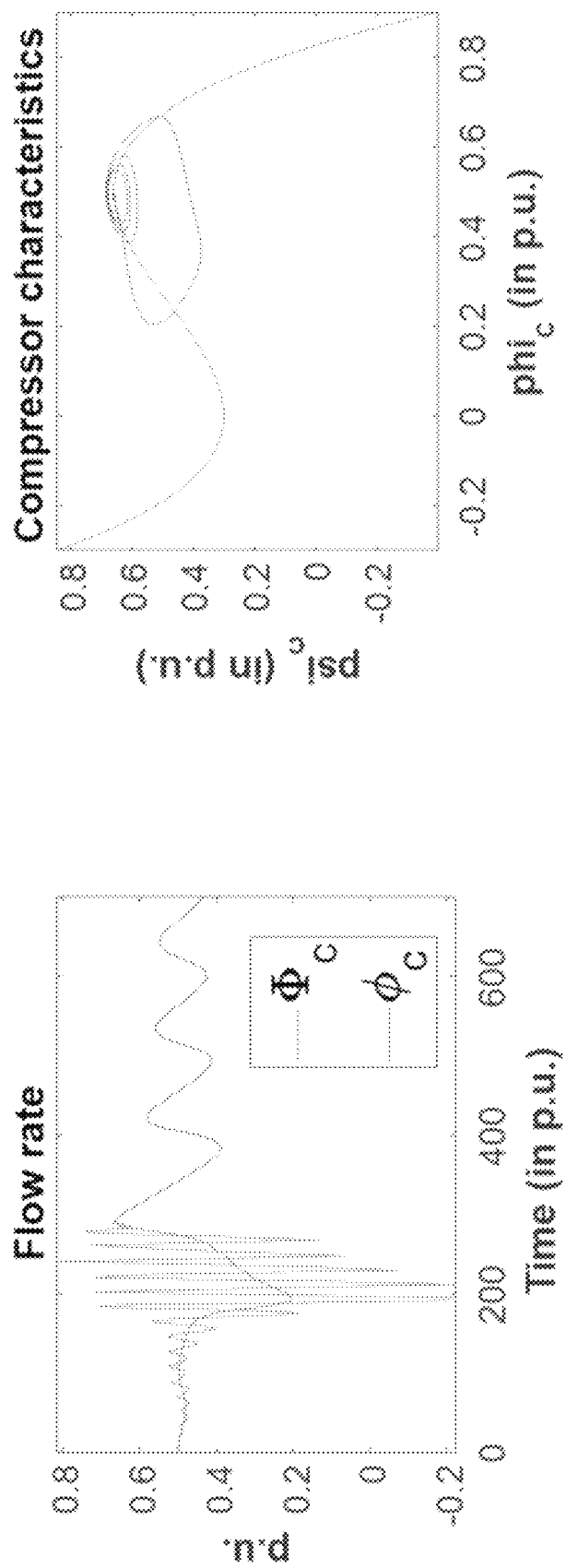
FIG. 14 shows Simulation 2: Open-loop surge instability Greitzer parameter B=1.

Scenario #1 shown in Simulations 1 and 2 (FIG. 13 and FIG. 14) represents a simulation of the well-known rotor stall and surge instabilities in engine at high speed [REF. 3A]. Effectively, our model is benchmarked here by reproducing these instabilities and using industry model of compressor [REF. 3B]. These oscillations represent a major concern, in particular during highly dynamic missions.

Figure 16:
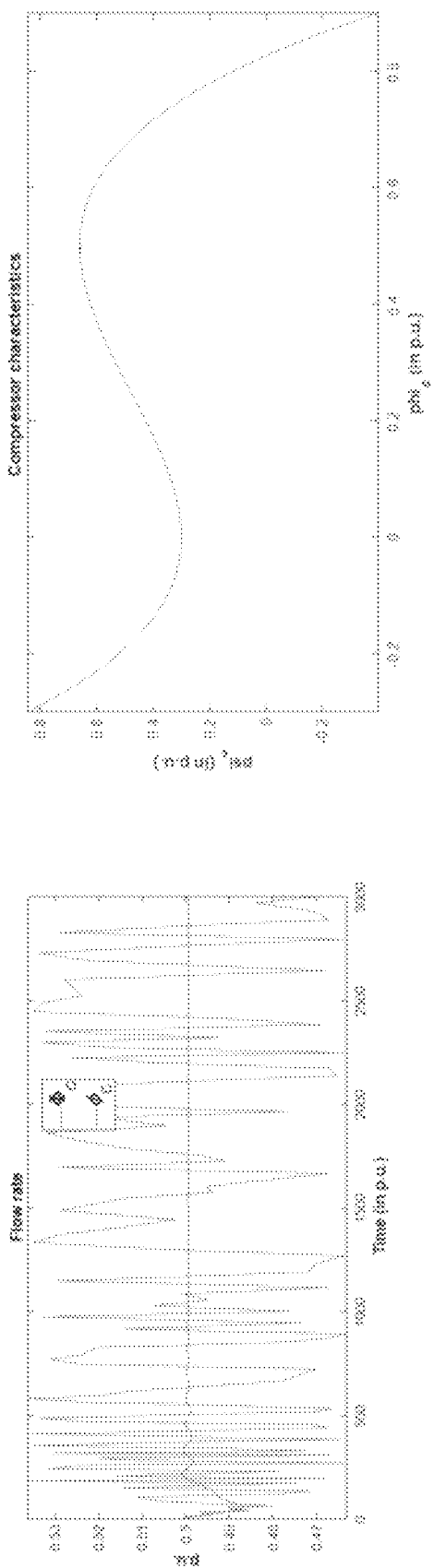
FIG. 16 shows simulation 4: State-of-the-art nonlinear surge control.

Scenario #2 (Simulations 3 and 4, FIG. 15 and FIG. 16) to show how conventional constant gain throttle control of engine may suffer from the same instabilities.

Scenario #3 (simulations 5 and 6, FIG. 17 and FIG. 18) show how well the proposed control of throttle using the energy space signals performs. This is done assuming constant shaft speed, an assumption universally made in the field. It can be seen that the throttle control almost fully cancels rotor stall and surge instabilities (a closer look indicates low frequency oscillations caused by the actual speed variations). It is important to observe that throttle control required may be too dynamic and not implementable, as it would cause mechanical wear-and-tear.

Figure 19:
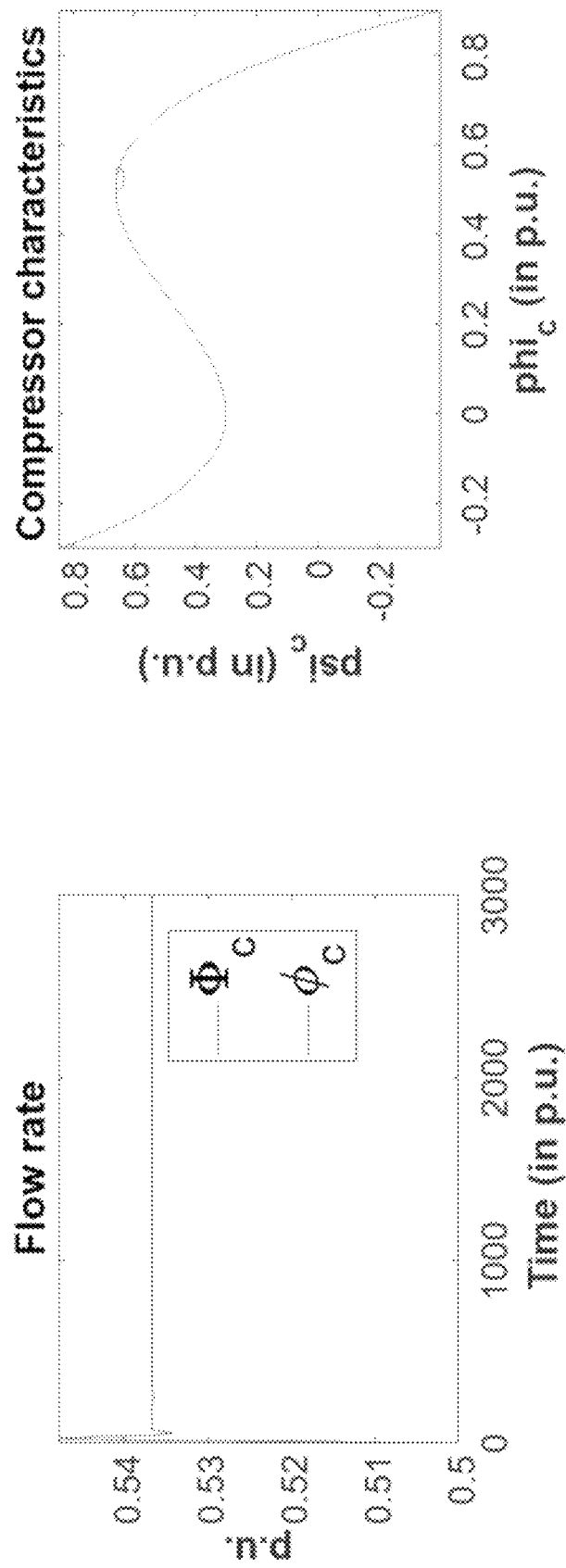
FIG. 19 shows Simulation 7: Proof-of-concept—proposed rotor stall control utilizing both throttle and torque control; both of which are reacting to Qdot. The throttle is reacting to Q_dot entering through the hydraulic port at the compressor inlet and the input torque is reacting to mechanical Qdot entering through the shaft.
Figure 20:
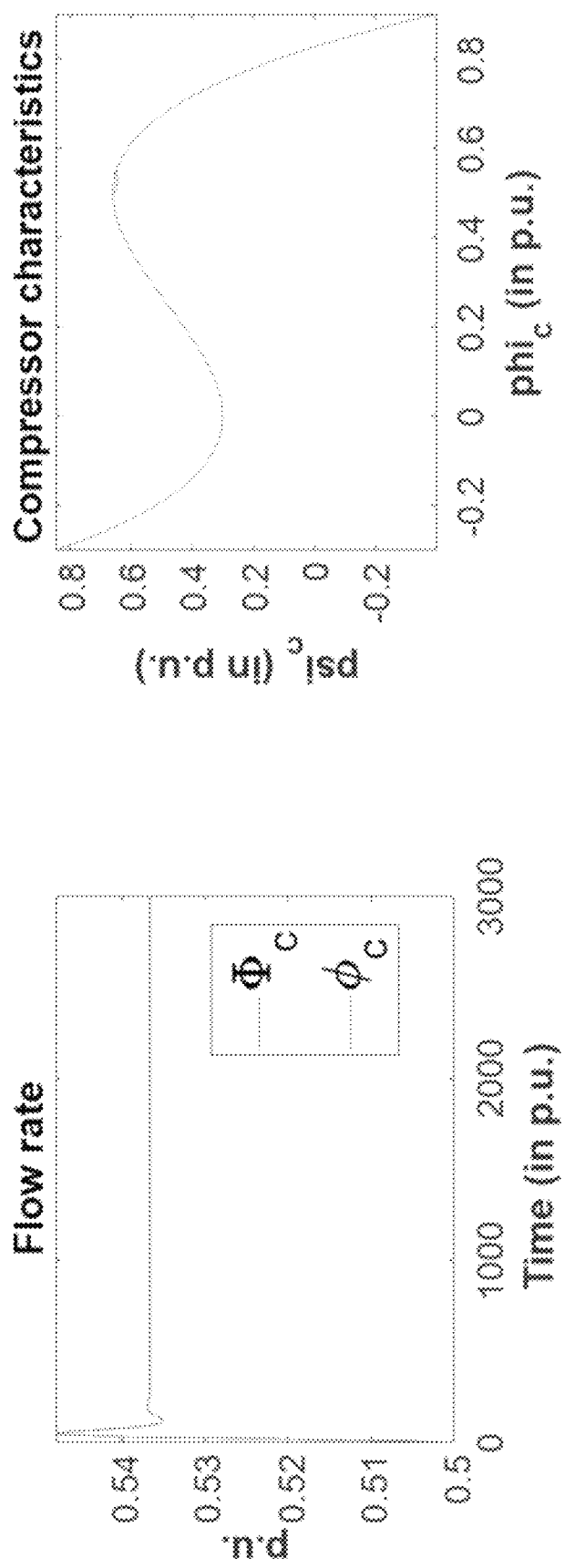
FIG. 20 shows Simulation 7: Proof-of-concept proposed surge control utilizing both throttle and torque control; both of which are reacting to Qdot. The throttle is reacting to Q_dot entering through the hydraulic port at the compressor inlet and the input torque is reacting to mechanical Qdot entering through the shaft.

Finally, Scenario #4 (simulations 7 and 8, FIG. 19 and FIG. 20) are the first proof-of-concept examples of how torque control by the governor and field exciter in generator (electric distribution) get rid fully of even slow rotor stall and surge problems. At the same time, torque control reduces the need for fast control by the hydraulic throttle.

While the actual time responses greatly depend on the type of engine-electric distribution designs, it is claimed that the same benefits to a lesser or larger degree can be claimed across various TeDP architectures. This makes the case for aircraft electrification for the first time in aircraft industry.

OTHER EMBODIMENTS

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. An energy-based modeling and control method for dynamic energy conversion and transfers in complex energy systems with multiple energy sources, including fuel and electric;
   wherein multi-layered modeling enables efficient and stable operation through optimized coordination of engine and electric components of a hybrid turbo-electric distribution system (TeDP);
   wherein a provable coordination of power and rate of change of power interactions between the components is done at a higher-system level, wherein advanced nonlinear control of components ensure that components meet power/rate of change of power commands given by the higher level;
   wherein rotor stall and surge instabilities in engines are eliminated by controlling the electric generators and/or storage;
   the method comprising the steps of:
   (a) providing a first linear dynamic model capturing a rate of change of energy-power interactions across engine and electric systems of the TeDP;
   (b) providing a detailed second linear dynamic model in energy space of an engine of the TeDP comprising compressor, burner, turbine subsystems and their rates of energy-power interactions;
   (c) providing a detailed third linear dynamic model of an electric system of the TeDP comprising generator, motor, and storage subsystems and their rates of energy-power interaction;
   (d) coordinating energy and power exchange between the engine and electric subsystems of the TeDP based on the provided first linear dynamic model;
   (e) controlling the engine and electrical subsystems utilizing the second and third linear dynamic models to ensure coordinated instantaneous power and rate of change of reactive power resulting from the first linear dynamic model, thereby ensuring a stable interconnected system and avoiding rotor stall and surge-type dynamical instabilities; and
   (f) coordinating exchanges between the subsystems to jointly enable feasible, stable and optimal TeDP system operation.

* * * * *

UNITED STATES PATENT AND TRADEMARK OFFICE
CERTIFICATE OF CORRECTION

| | | |
|---|---|---|
| PATENT NO. | : 12,037,126 B1 | Page 1 of 1 |
| APPLICATION NO. | : 16/568904 | |
| DATED | : July 16, 2024 | |
| INVENTOR(S) | : Marija Ilic and Rupamathi Jaddivada | |

It is certified that error appears in the above-identified patent and that said Letters Patent is hereby corrected as shown below:

In the Claims

In Column 14, Claim 1, Line 12, please delete "interaction" and insert -- interactions --.

Signed and Sealed this
Seventeenth Day of September, 2024

Katherine Kelly Vidal
*Director of the United States Patent and Trademark Office*